July 28, 1942.　　A. J. FETTIG　　2,291,154
CALCULATING MACHINE
Filed Oct. 4, 1938　　10 Sheets-Sheet 1

INVENTOR
Arthur J. Fettig
BY Davis, Lindsey, Smith & Shonts
ATTORNEYS

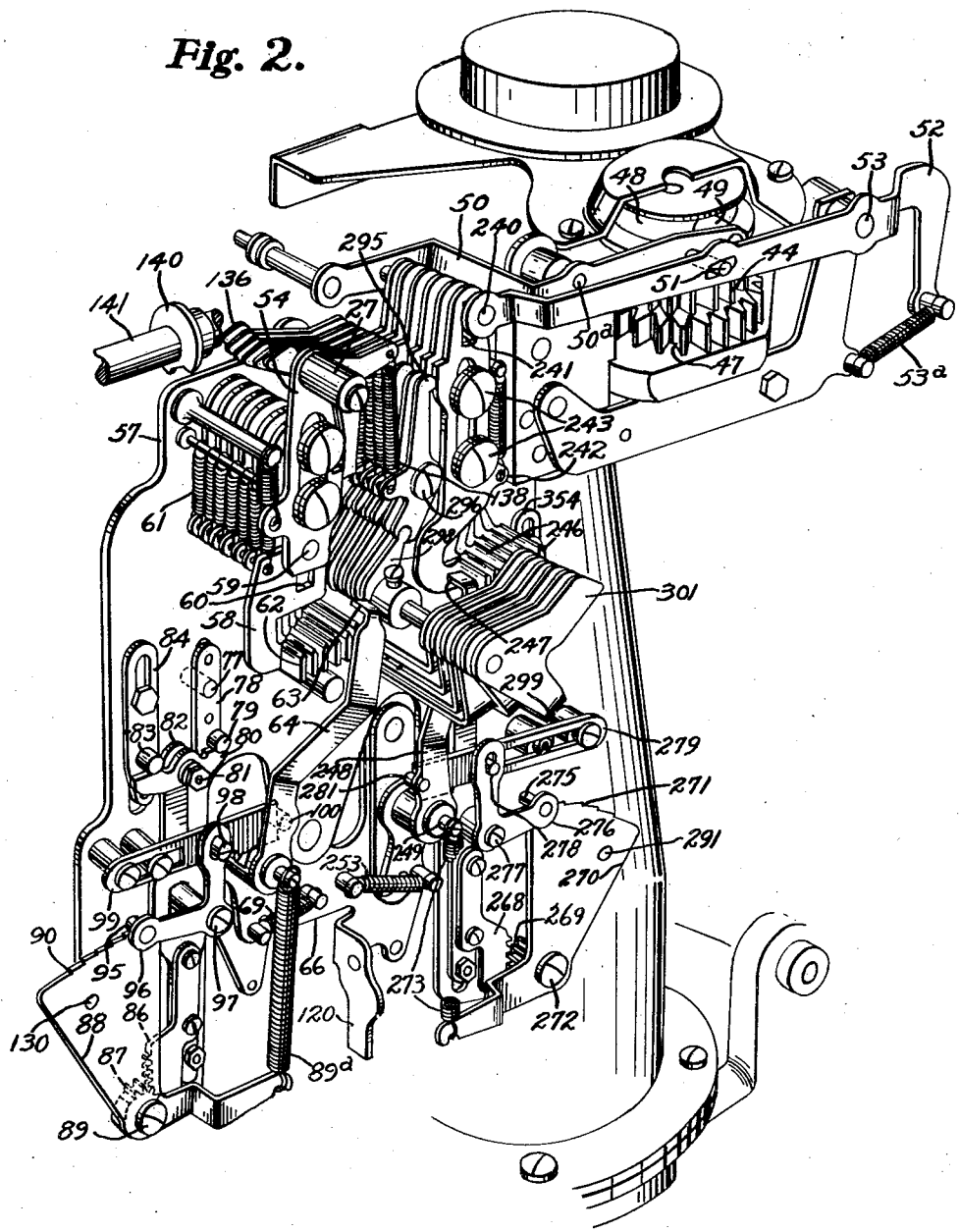

July 28, 1942.　　A. J. FETTIG　　2,291,154

CALCULATING MACHINE

Filed Oct. 4, 1938　　10 Sheets-Sheet 3

INVENTOR
Arthur J. Fettig
BY Davis, Lindsey, Smith & Shonts
ATTORNEYS

July 28, 1942.   A. J. FETTIG   2,291,154
CALCULATING MACHINE
Filed Oct. 4, 1938   10 Sheets-Sheet 4

INVENTOR
Arthur J. Fettig
BY Davis, Lindsey, Smith & Shonts
ATTORNEYS

July 28, 1942.  A. J. FETTIG  2,291,154
CALCULATING MACHINE
Filed Oct. 4, 1938  10 Sheets-Sheet 5

INVENTOR
Arthur J Fettig
BY Davis, Lindsey, Smith & Shonts
ATTORNEYS

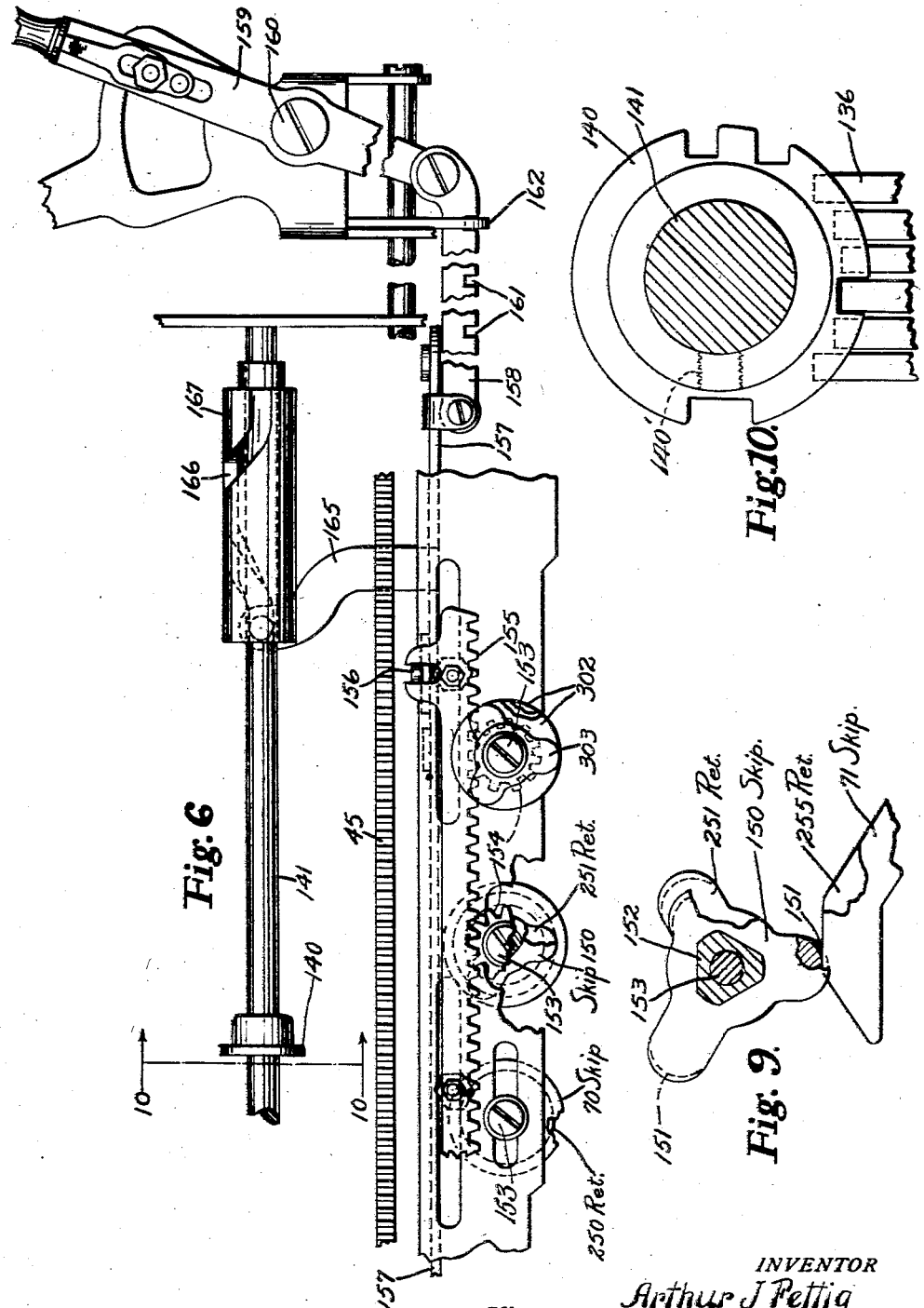

July 28, 1942.  A. J. FETTIG  2,291,154
CALCULATING MACHINE
Filed Oct. 4, 1938  10 Sheets-Sheet 7

INVENTOR
Arthur J Fettig
BY Davis, Lindsey, Smith & Shonts
ATTORNEYS

July 28, 1942.  A. J. FETTIG  2,291,154
CALCULATING MACHINE
Filed Oct. 4, 1938  10 Sheets-Sheet 9

| TRANS. | ROLL NO. | MOTOR BAR | LEVER 159 POS. | A | B | C | D | E | F | G | H | I | J | K | L |
|---|---|---|---|---|---|---|---|---|---|---|---|---|---|---|---|
| 1 | NONE | REG. | 1 | * | | | | | | | | | | | |
| 2 | #1 | REG. | 1 | | * | | | | #3 | #1 | | | | | |
| 3 | #3 | REG. | 2 | | * | | | #2 | | | #6 | | | | |
| 4 | #6 | REG. | 3 | | * | | | | | | | #4 | | | |
| 5 | NONE | #2 AUX. | 1 | * | | | -#5 | | | | | | | | |
| 6 | NONE | #4 AUX. | 1 | * | | | -#5 | | | | | #4 | #6 | | |
| 7 | NONE | #5 TOTAL | 1 | * | | | | | | | | | | | |
| 8 | #6 | REG. | 2 | | * | | | | | | | | | | |
| 9 | #3 | #2 AUX. | 2 | | * | | | | | #1 | | | | | |
| 10 | #6 | #2 AUX. | 3 | | | | | | | | | | | | |
| 11 | #1 | REG. | 1 | | | | | * | | | | | | -#5 | |
| 12 | #3 | #2 AUX. | 1 | | | | | * | * | | | | | | #2 |
| 13 | NOR. | #4 AUX. | 2 | | | | | * | | | * | | | | #3 |
| 14 | #2 | REG. | 1 | | | | | | | | | | | | |
| 15 | #3 | REG. | 1 | | | | | | | | | | | | |

*Fig.15.*

INVENTOR
Arthur J. Fettig
Davis, Lindsay, Smith & Shonts,
ATTORNEYS

Patented July 28, 1942

2,291,154

UNITED STATES PATENT OFFICE 2,291,154

CALCULATING MACHINE

Arthur J. Fettig, Detroit, Mich., assignor to Burroughs Adding Machine Company, Detroit, Mich., a corporation of Michigan Application October 4, 1938, Serial No. 233,280

28 Claims. (Cl. 197—177)

This invention relates to calculating machines and more particularly to calculating machines used by commercial houses for bookkeeping purposes.

Machines of this type are provided with traveling carriages and are used for making entries in certain columns on two or more preruled forms as the carriage travels across the machine. In the usual run of commercial transactions it is desirable to skip different columns when the carriage is moving in tabulating direction, and to return the carriage from different intermediate columnar positions to intermediate positions on the forms. For example in banking work, sometimes deposits are entered without withdrawals, and vice versa, which makes it desirable, in certain instances, to skip tabulate the withdrawal column and, in other instances, to skip tabulate the deposit column. In commercial work it is likewise sometimes desirable to skip the credit column and, at other times, to skip the debit column when making charge or credit runs. Similar instances also occur in public utility applications.

It has been found in recent years that the columns to be skipped and the positions from which and to which the carriage is to be returned not only vary for different users in accordance with their accounting forms, but also vary materially for a single user as to forms used. That is, the forms of a single user will differ in accordance with the type of transaction or series of entries being made. Skip tabulation and selective carriage return have been accomplished in the past by providing suitable individual and independent mechanisms for controlling the paper carriage in its tabulating and return movements.

In the Rinsche Patent No. 1,580,534 provision is made for skip tabulating the carriage under control of a special key such as an auxiliary motor bar. Provision is also made for returning the carriage from an intermediate column, under control of a special key, to some column other than the initial column. In the Muller Patent No. 1,942,216 provision is made for automatically controlling skip tabulation of the carriage by the carriage so that automatic and delayed as well as intermittent skip tabulation is obtained.

These mechanisms, however, are not sufficiently flexible or adaptable to all the requirements of modern bookkeeping systems and in some instances the individual and independent controls conflicted and interfered with each other. This necessitated designing special and complicated arrangements for each particular installation.

Because of this and because machines capable of performing this type of work are necessarily complicated and incorporate many different and independent carriage control features they must usually be constructed and assembled specially at the factory to suit each customer's order. That is, the set-up of the machine is usually special in each case and the machine must be assembled to suit the particular needs and bookkeeping forms employed by the customer in his particular accounting system. This lack of uniformity in bookkeeping forms and lack of flexibility of machines, makes it impossible to stock machines of this character at the agencies. In fact, the forms of a single customer frequently vary to such an extent that it is impossible for a single installed machine to handle the different forms used. Furthermore if one or more forms are to be discontinued it has been found necessary to return the machine for redesign and to have various features either omitted or added in order to accommodate the machine to new and widely varying applications.

This condition obviously complicates matters not only in the manufacture of machines of this kind, but also in the servicing of the machines in the field where a large number of special parts must be ordered to be able to service each special machine.

It is the purpose of the present invention to provide a machine which may be readily adjusted, with a minimum change of parts, to accommodate the machine to widely differing accounting forms.

It is an object of this invention to provide a machine incorporating a single unit which will provide the necessary controls of carriage movements and functions both in tabulating and return directions and whereby the machine may easily be adapted to various programs and to widely different forms.

Other objects and their resultant advantages will be apparent from the following description, particularly when considered in connection with the drawings, in which:

Fig. 2 is a perspective view of the carriage control unit comprising the present invention and illustrating the parts thereof in normal position;

Fig. 6 is a partial rear elevation of the carriage illustrating the controls for adjusting the machine to perform different transactions;

Fig. 9 is a large detail of one of the control roll assemblies;

Fig. 10 is an enlarged sectional detail taken along line 10—10 of Fig. 6;

Figure 16:
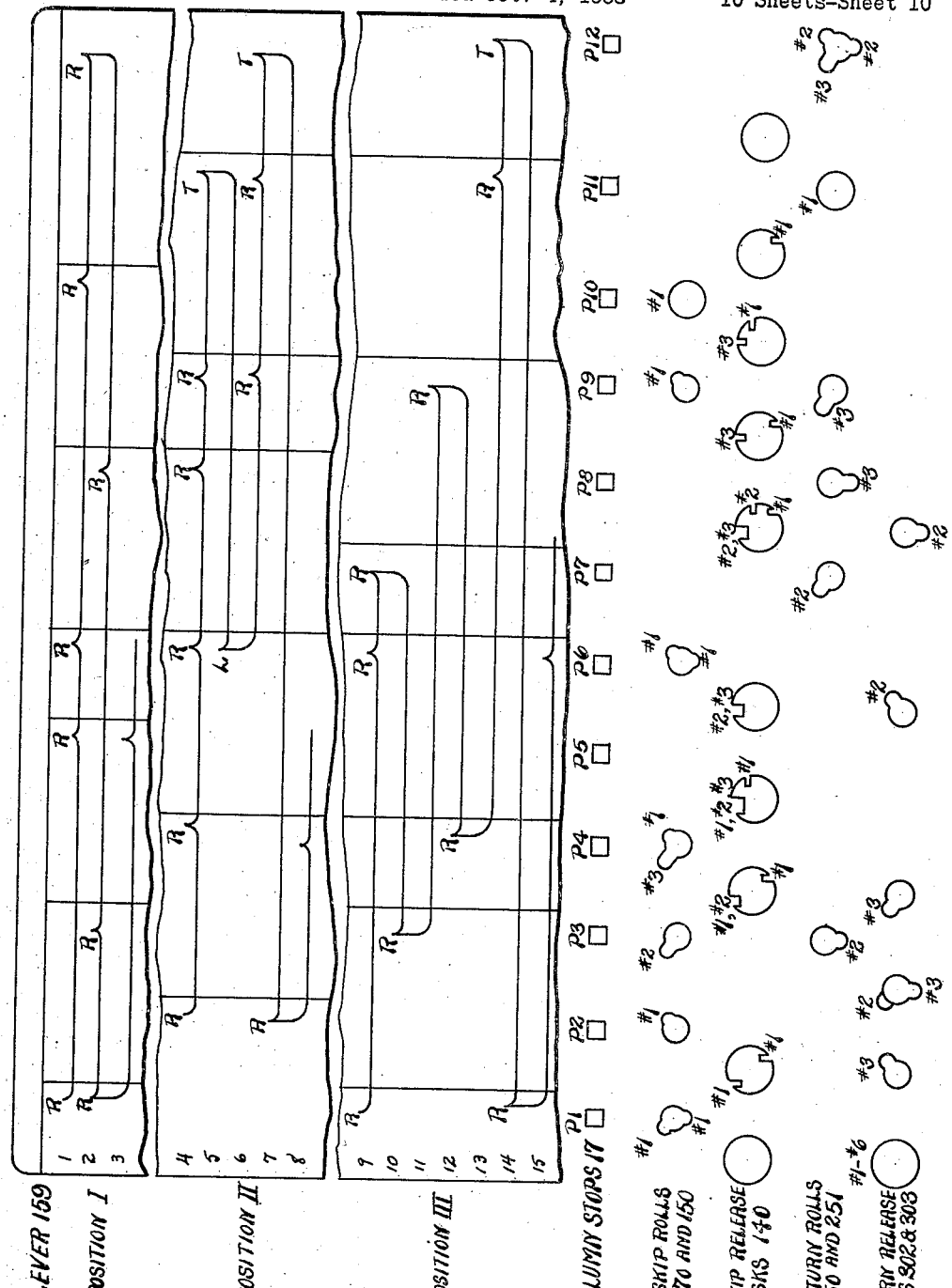

Fig. 15 is a diagrammatic illustration of some of the tabulating movements that the carriage may be caused to take; and Fig. 16 illustrates diagrammatically an example of the work to be performed on the machine and also illustrates diagrammatically the setup of the carriage tabulating and return control members on the carriage for producing the programs of carriage movements required for said example of work.

The present invention has been illustrated as applied to a Burroughs high keyboard machine which is well known in the art and illustrated in many patents. In general, the machine is like that disclosed in the Rinsche Patent No. 1,580,534 and has a plurality of banks of amount keys 1 (Fig. 1) which actuate wires 2 for controlling the actuators 3 which, in turn, operate any desired number of registers, such as 4 and 5, for performing the usual calculating operations. The actuators also control type carriers 9 which contain type 10 for printing upon paper supported by the platen 11 mounted in a tilting frame 12 supported by the traveling paper carriage 13. The paper carriage tabulates from right to left, when looking at the machine from the front, and is returned from left to right preferably by power means. The machine may be operated by hand although it is preferred to operate the machine electrically by a motor 14, as disclosed in the Vincent Patent No. 866,750, which operates through a clutch mechanism 14 to drive a main shaft 15. The machine may also be provided with an automatic repeat print and cycle mechanism as disclosed in the Muller Patents Nos. 1,397,774 and 2,087,542.

The invention primarily concerns the control of columnar printing in such a way that the machine may be quickly and easily adjusted to operate upon widely differing accounting forms without requiring structural changes in the machine. In the embodiment shown, this is accomplished by controlling the paper carriage, and use is made of certain of the existing mechanisms associated with the carriage, for which reason the construction, arrangement and operation of the carriage and the means for moving and controlling it will be more particularly described. The calculating mechanisms of the machine are well known and a detailed description of them is not necessary for an understanding of the present invention.

Figure 14:
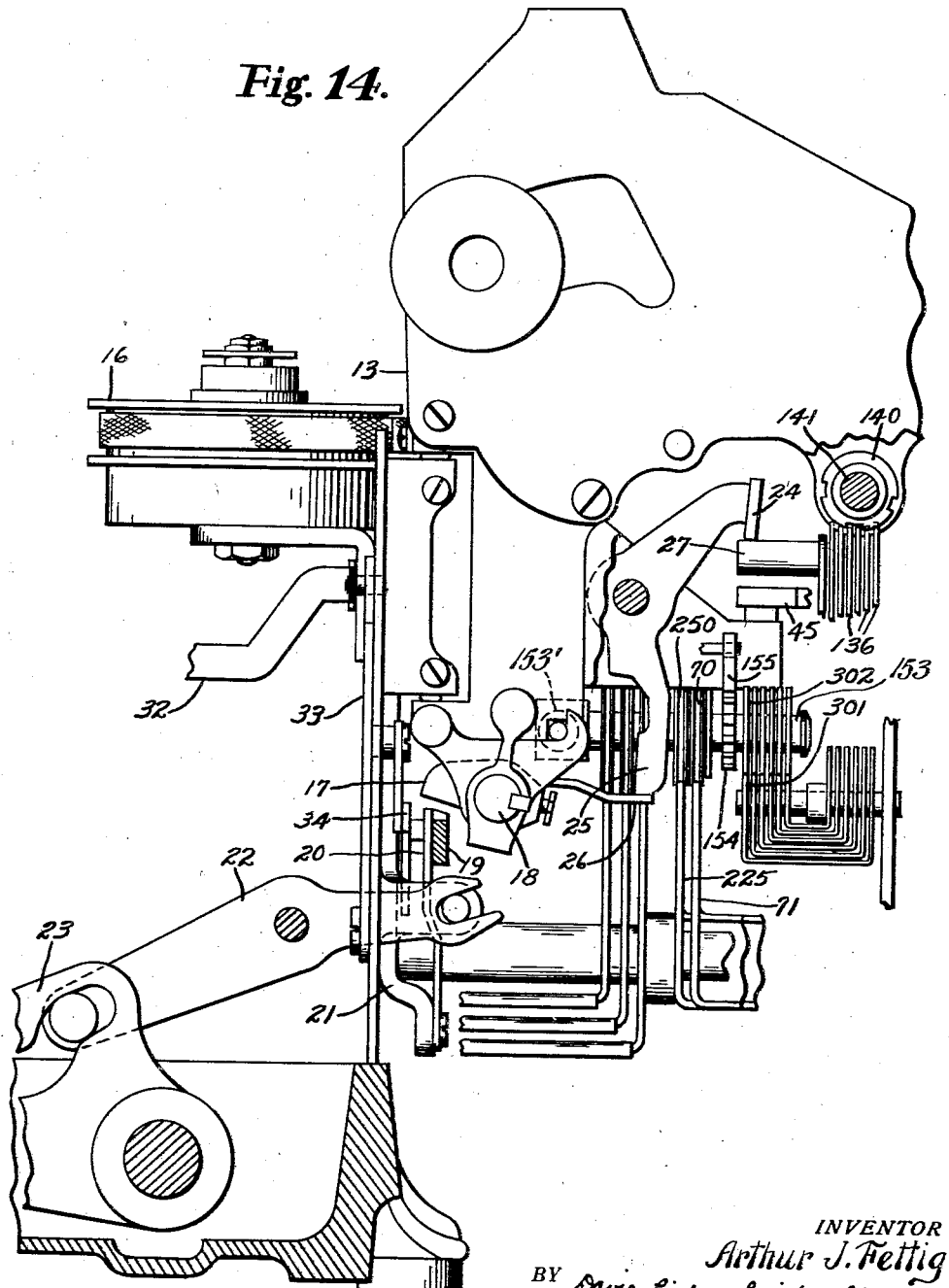
Fig. 14 is an end elevation of a portion of the rear of the machine illustrating mainly the carriage control mechanisms.

As is customary in Burroughs machines of this type, the carriage 13 is mounted for lateral movement across the rear of the machine and is moved in tabulating direction by a drum spring 16. Movements of the carriage in tabulating direction are controlled by adjustable stops 17 mounted for horizontal adjustment on a rocking stop bar 18 supported by the carriage, there being a stop for each columnar position of the carriage. The bar is urged counterclockwise (Fig. 1) by means of a spring (not shown) which permits the bar to be rocked clockwise so that the active adjustable stop 17 may be released from the fixed stop 19. Near the end of the return stroke of the machine the active stop 17 is raised above the fixed stop 19 to permit the carriage to tabulate to the left until the next stop 17 engages the fixed stop 19. The active stop 17 is moved upwards (Fig. 14) by means of a pawl 20 pivoted at its lower end to a reciprocating slide 21 that is moved downward during the forward stroke and upward during the return stroke of each cycle of operation of the machine. The end of this pawl normally moves under the active stop during the downward movement of the slide 21 so that when the slide 21 is raised the active stop 17 is also raised. The slide 21 is reciprocated vertically as stated, by means of a lever 22 that is rocked in each cycle of operation of the machine by a cam 23 connected to the operating mechanism of the machine. For further description of the carriage tabulating mechanism reference is made to the Lundgren Patent No. 1,195,599, Rinsche Patent No. 1,580,534 and the Muller Patent No. 1,942,216.

As disclosed in the Rinsche patent, the carriage is provided with a skip tabulating bail 24 (Fig. 1) which has or controls a downwardly extending arm 25 which, when released, overlies an arm 26 rigidly secured to and extending rearwardly from the stop bar 18. When the arm 26 is moved downwardly by the rocking of the stop bar 18, the arm 25 can move forward above the arm 26 if the bail 24 is free for movement downward. This will lock the stop bar 18 in rocked position and consequently retain the tabulating stops 17 out of position for engagement with the fixed stop 19. However, the skip tabulating control bail 24 is under control of a control stud 27 (Figs. 1, 2 and 14) which normally holds the bail 24 upward. In the Rinsche Patent No. 1,580,534, said stud can be moved downward under control of a skip tabulating key, and latched down by a latch controlled by the skip release knockers on the carriage. In accordance with the present invention, both the downward movement and the release of the stud 27 are controlled automatically by the carriage, as will be explained later.

The machine is provided with the usual carriage normal key 28 (Fig. 1) for disabling the carriage tabulating mechanism. This key is carried by the upper end of a stem 29 connected at 30 to a vertical slide 31 so as to lower the latter upon depression of the key. The slide 31 has a rearwardly projecting arm 32 which engages a lever 33 connected to a thrust bar 34 for controlling the tabulating pawl 20 as shown in the Lundgren Patent No. 1,195,599 so as to disable the tabulating mechanism by rocking the pawl about its pivot from beneath the active stop 17 and preventing the pawl from raising the active stop 17 when the carriage normal key is depressed.

Figure 5:
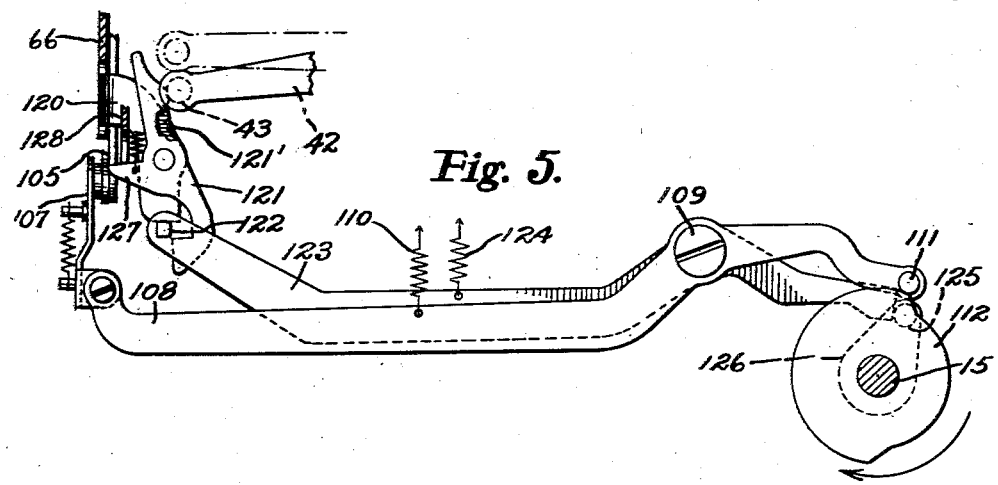
Fig. 5 is a left side detail elevation of the power means for controlling the carriage control unit.

The lower end of stem 29 extends rearwardly and has an arm 35 which arm, in addition to engaging other devices of the machine, engages a stud 36 (Fig. 1) carried by a lever 37 pivoted at 38. The rearward end of this latter lever 37 carries a stud 39 which is positioned to engage an arm 40 of a yoke 41 pivoted at 206 and spring-urged in a counterclockwise direction. Another arm 42 of this yoke carries a stud 43 adapted to engage the pawls 121 and 121' of Fig. 5 or a pawl 121ᵃ of Fig. 13 for disabling the skip tabulating and carriage return mechanism as will be described later. In other words, depression of the carriage normal key 28 not only disables the carriage tabulating mechanism but also disables the automatic skip tabulating and carriage return mechanisms to prevent these latter mechanisms from functioning during a machine operation.

The carriage 13 is preferably moved in return direction by power means as disclosed in the Rinsche Patent No. 1,580,534. In brief, this mechanism includes a unit at the rear of the machine having a gear 44 (Fig. 2) constantly engaged with a rack 45 (Fig. 6) supported by the paper carriage. A second gear 47 (Figs. 2 and 4) is driven directly by the motor 14 whenever the latter is in motion and is connected to the first gear 44 by a clutch member 48 (76 of Rinsche 1,580,534) having two depending lugs (not shown) which couple the gears when the clutch member is moved downwardly. This causes the carriage to be returned from left to right, as viewed from the front. As the carriage reaches the end of its full return movement, the clutch member 48 is moved upwardly to disengage the two gears 44 and 47, thereby leaving the carriage under control of the tabulating mechanism. The clutch member is controlled by a stud 49 (103 of Rinsche) projecting from a lever 50 (99 of Rinsche) pivoted at 50ᵃ to the carriage return unit. A second stud 51 projects from lever 50 and passes through a slot in a lever 52 pivoted at 53 and urged clockwise by a spring 53ᵃ. Lever 52 controls the clutch 48 through the carriage return control mechanism of this invention, as will be described later. For further details of the clutch mechanism per se, reference is made to the Rinsche Patent 1,580,534.

INDEXING OF CARRIAGE TABULATION

In the ordinary machine, as an incident to each machine cycle, the carriage automatically moves to its next adjacent columnar position, or it may be caused to skip a certain number of columns and stop at one predetermined column. The new improvement preferably makes use of the mechanisms by which these results are obtained and it is combined with them in such a way that, with the carriage in any one of its columnar positions, the tabulating mechanism may be indexed, either manually, or automatically by the carriage itself, to determine the column to which the carriage will move at the end of the machine cycle.

The mechanism of the present invention is in the nature of a compact control unit mounted on a main supporting plate 57 that is detachably secured to the rear of the machine.

Figure 4:
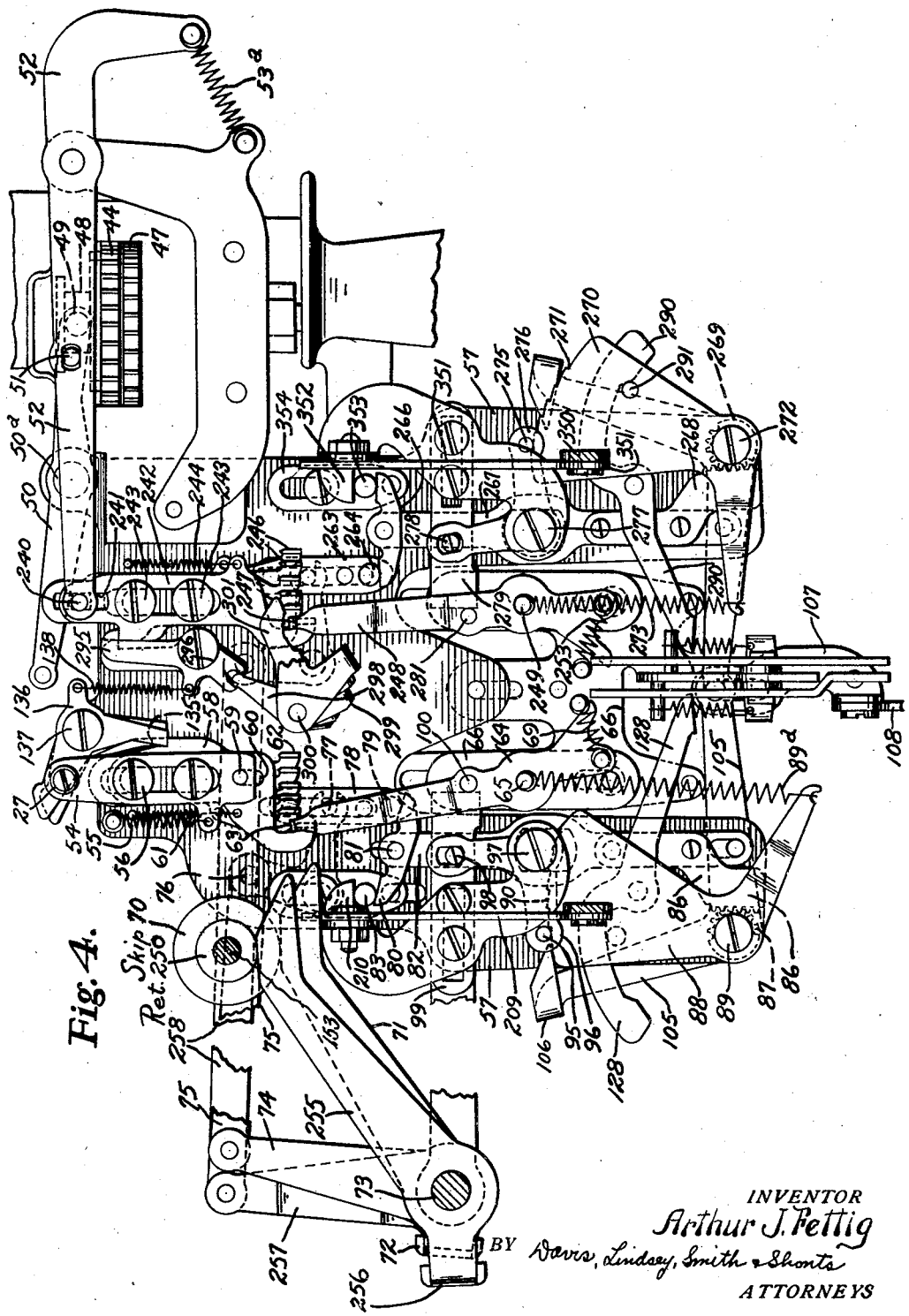
Fig. 4 is a front elevation of the carriage control unit showing both the skip tabulating and carriage return mechanisms in indexed positions for purposes of illustration although such a condition would not occur in actual machine operation.

Referring to Fig. 2, the stud 27 which controls the ball 24 (Fig. 1) is carried by a vertical slide 54 (Fig. 2) which is mounted to slide vertically on two studs 56 attached to the main supporting plate 57. The slide 54 is urged upward by a spring 55 (Fig. 4). It will be recalled that, when the stud 27 is lowered, it frees the ball 24 so that, if the "tab" shaft 18 carrying the "tab" stops 17 is rocked to carriage-releasing position, the arm 25 of ball 24 will hold said shaft in said position until the shaft is released. In the present invention, the stud 27 may be lowered by any one of six control slides 58 (Fig. 2) which are mounted for vertical sliding movement on the stud 56, said slides 58 being urged upward by individual springs 61. Each of the slides 58 has a slot 60 (Fig. 2), and extending through these slots is a relatively long stud 59 projecting inward from the slide 54 toward the main plate 57, the arrangement being such that, when any one of the slides 58 is pulled downward, the upper end of its slot will act on the stud 59 to also pull the slide 54 downward.

The lower ends of the six slides terminate in lateral lugs 62 (Fig. 2) which are in position to be selectively engaged by an inturned lug 63 formed on the upper end of a pivoted and slidingly supported index member or selector 64 pivoted at 65 (Fig. 4) to a sliding plate 66 (Figs. 3 and 4) mounted for vertical sliding movement on the rear of the main plate 57 by three stud and slot connections 67 (Fig. 3), the plate 57 being cut away to permit the slide 66 to be upon the rear and the selector 64 to be upon the front thereof. The slide 66 is constantly urged upwardly by a spring 68 (Fig. 3) and the selector 64 is constantly urged counterclockwise (Fig. 4) by a spring 69. The purpose of the pivoted and sliding selector 64 is to engage and lower a selected one of the six slides 58 in accordance with the columnar position of the paper carriage. The six slides are used to provide for different selections of columns so that different tabulating movements of the carriage may be accomplished. More or less slides may be provided as desired.

*a. Automatic indexing—Carriage tabulation*

The six slides may be indexed automatically under the control of the carriage so that the carriage itself determines the next column to which it shall move. This is accomplished by moving the selector 64 about its pivot to select one of the six slides by different sized control rolls on the carriage. For this purpose, rolls 70 (Figs. 4, 6 and 14) of the desired sizes are mounted on studs 153 adjustably mounted on a bar 153' (Fig. 14) removably secured to the carriage, so that in the desired columnar positions of the carriage, the rolls 70 will engage an arm 71 (Fig. 4) of a yoke 72 journaled on a fixed shaft 73. The yoke 72 has a second and upstanding arm 74 which is connected to one end of a link 75, the other end of which is connected to one arm of a bell crank 76 (Fig. 3) pivoted to the outside of the plate 57. The other arm of the bell crank 76 has a forked end which engages a stud 77 (Fig. 2) carried by a short vertical slide 78 (Figs. 2 and 4) mounted for vertical sliding movement upon the inside surface of the plate 57, the latter having a slot through which stud 77 passes. The vertical slide 78 carries a second stud 79 at its lower end in position to engage one end of a rocker or whipple-tree 80 pivoted intermediate its ends at 81 to the upper end of a vertical slide 82. The other arm of rocker 80 is adapted to be engaged by a stud 83 projecting from another parallel vertical slide 84, for reasons to be described later. The rocker carrying slide 82 extends downwardly and, at its lower end, carries a rack 86 which is in constant mesh with a gear 87 secured to an index plate 88 pivoted at 89 to the main plate 57. Index plate 88 is constantly urged counterclockwise about its pivot by a spring 89d and is provided at its upper edge with a series of steps 90. The upper stepped edge 90 of index plate 88 is engaged, under certain conditions, by a sensing stud 95 projecting from one arm of a bell crank 96 pivoted at 97 to the plate 57. The other arm of this bell crank 96 has a stud and a slot connection 98 with a horizontal slide 99, the inner end of which engages a stud 100 extending from the pivoted selector 64 and limits the counterclockwise movement of the selector under urge of its spring 69. Accordingly, the position of the index plate 88 and the arrangement of its stepped edge 90 determine the position of the selector 64 to cause it to overlie the lateral lug 62 of a selected slide 58, the position of the index plate being determined by the size of the active roll 70 used in the particular columnar position of the carriage. In other words, the sizes of the rolls 70 and the conformation of the index plate determine the tabulating movement or program of tabulation of the carriage and a variation in either or both will vary this program.

It is undesirable to permit the stud 95 to engage the upper stepped edge 90 of the index plate 88 until the latter has been positioned. Therefore, provision is made to retain the stud 95 out of engagement with the control plate 88 until the latter has been indexed, after which the stud is permitted to drop into contact with the upper edge of the index plate.

For this purpose a bell crank 105 (Figs. 3 and 4) is pivoted to the outside of plate 57 which bell crank has an upper cam end 106 adapted, when in normal position (Fig. 3), to engage and lift stud 95 out of engagement with the upper stepped edge 90 of index plate 88. The lower arm of bell crank 105 is connected by a link 107 to one end of a lever 108 (Figs. 1, 4 and 5) pivoted intermediate its ends at 109 to the machine base and constantly urged clockwise by a spring 110. The other end of lever 108 carries a stud 111 which engages a cam 112 mounted on the main clutch shaft 15 which is rotated a single revolution in a clockwise direction (Fig. 5) for each machine operation. The cam 112 has a high portion for about one-half of its periphery and a low portion for the remaining half. The positioning of the cam is such that, after the index plate 88 has been indexed and during the machine operation, the stud 111 drops off the high portion of the cam to the low portion causing link 107 to move upward and rock the crank 105 counterclockwise to release stud 95 and permit the latter to engage the index plate 88. Thus, the selector 64 is indexed to a position over a selected slide 58 in accordance with the size of the carriage roll 70. After this, the selector is lowered by means to be described below to lower the selected slide and stud 27 to release the skip tabulating bail 24. Then, near the end of the machine operation but still before tabulation of the paper carriage, the high portion of the cam is again effective to cause the cam end 106 of bell crank 105 to reengage stud 95 and lift the latter from the index plate 88.

The means for lowering the selector 64 and the selected slide 58 is as follows:

The selector slide 66, which is normally urged upwardly by the relatively strong spring 68 (Fig. 3), is provided with an inturned lateral extension 120 (Figs. 3 and 5) at its lower end on which is pivoted a pair of pawls 121 and 121', the latter being spring-urged in a clockwise direction (Fig. 5) and having hooked ends adapted to engage a square stud 122 under certain conditions. The stud 122 is carried on the end of a lever 123 pivoted at 109 to the machine frame and urged clockwise by a spring 124. The rear end of lever 123 is adapted to be engaged by a stud 125 carried by an arm 126 secured to the main clutch shaft 15. Near the end of each revolution of shaft 15 and while the stud 95 is still engaged with the stepped edge 90 of the sector 88, the stud 125 engages and rocks lever 123 counterclockwise to lower the stud 122 carried thereby. Accordingly, if either pawl 121 or 121' is in position to be engaged by stud 122, the pawl and slide 66 will be lowered for a short period, after which the slide and levers will be returned by their springs.

Provision is made for permitting pawl 121 to engage stud 122 only when necessary, that is, only after the index plate 88 has been indexed. For this purpose pawl 121 is formed with a laterally extending arm 127 positioned to be engaged by a lever 128 (Figs. 3 and 5) pivoted at 129 to the forward side of plate 57 and having an arm projecting in position to be engaged by a stud 130 on the index plate 88. The construction is such that, when the index plate is in normal position, stud 130 holds lever 128 in the position of Fig. 3, so that it holds pawl 121 in the position of Fig. 5 out of possible engagement with the square stud 122. As soon as the index plate 88 is moved, however, lever 128 rocks counterclockwise (Fig. 3), and releases pawl 121, so that it will engage the square stud, whereby the slide 66 and the selector 64 are lowered to lower the selected one of the six slides 58. This occurs during the latter part of the machine operation and after printing has taken place but while the stud 95 is still in engagement with the stepped edge 90 of the sector 88 and before tabulation of the paper carriage.

It is necessary, of course, to retain the selected and lowered slide 58 in its lower position in order that the skip tabulating bail will be lowered for a sufficient length of time. For this purpose, each of the six vertical slides 58 is formed with a notch 135 (Figs. 2 and 4) along one edge adapted to be engaged by one arm of a latch 136 pivoted at 137 to a supporting plate 57, the latches being urged clockwise into latching position by springs 138. It will be understood, of course, that there is a notch in each slide and a latch for each slide.

From the foregoing it will be apparent that the stepped plate 88 is indexed by the carriage when the latter moves to a predetermined position where the machine is to be given a cycle of operation. During the cycle, the arm 105 is raised so that the selector 64 is released and the latter moves to a position determined by the index plate 88, in which position the selector overlies one of the selected slides 58. After this indexing has occurred, and during the machine cycle, the plate 66 is lowered to lower the selected slide 58, which slide is thereupon latched in position by its latch 136, and the tabulating bail 24 is lowered so that it will latch the "tab" bar 18 in a carriage-releasing position when the bar 18 is rocked to that position to tabulate the carriage. Then the slide 66 and selector 64 are again elevated and the arm 105 is again lowered to rock the selector back to normal. Fig. 4 illus- 158 to the lower end of an adjusting handle 159 pivoted to the carriage frame at 160. The movement of the handle 159 moves the slide 157 and also the rack 155, thereby rotating gears 154 and the three-armed members 150 to present the desired or selected arm thereof for engagement with the skip control lever 71. The link 158 is preferably notched, as at 161, to retain the handle 159 and member 154 in adjusted position by means of a detent 162.

In changing the condition of the three-armed members 150, to change the automatic indexing of the tabulating mechanism, it is often desirable to also vary the effects of the release disks 140 which determine where the carriage shall be arrested in response to the indexing. In order to accomplish this, the slide 157 is provided with an upstanding arm 165 having a stud projecting therefrom which enters a helical cam 166 formed in a sleeve 167 secured to the release lug shaft 141. Accordingly, movement of the slide 157 will not only move the rack 155 and three-armed member 150, but will also rotate shaft 141 to vary the effectiveness of the release disks 140. The shape of the helical cam and the number and effects of the three-armed members 150 may be varied to suit the demands of the user.

It follows from the foregoing that, by manipulating only a single lever 159, the automatic indexing of the tabulating mechanism by the carriage may be varied, or the effects of said indexing may be varied, or both the indexing and the effects of indexing may be changed. If the indexing only is to be changed, the parts are arranged so that the movement of lever 159 rotates the three-armed members 150 but not the release disks 140. If it is desired to change only the effects of indexing, then the release disks 140 are rotated, while the three-armed members are not. If both are to be varied, then both the three-armed members 150 and the disks 140 are rotated by the lever 159 as above explained.

It is also relatively easy to change the effects of indexing by changing the stepped index plate 88, which can be done in the field without necessitating the return of the machine for a complete reassembly.

c. Manual indexing—Carriage tabulation

Provision is also made for indexing the tabulating mechanism manually, and under joint manual and carriage control. Several examples have been illustrated as follows:

1. Motor bar control

Figures 1, 8:
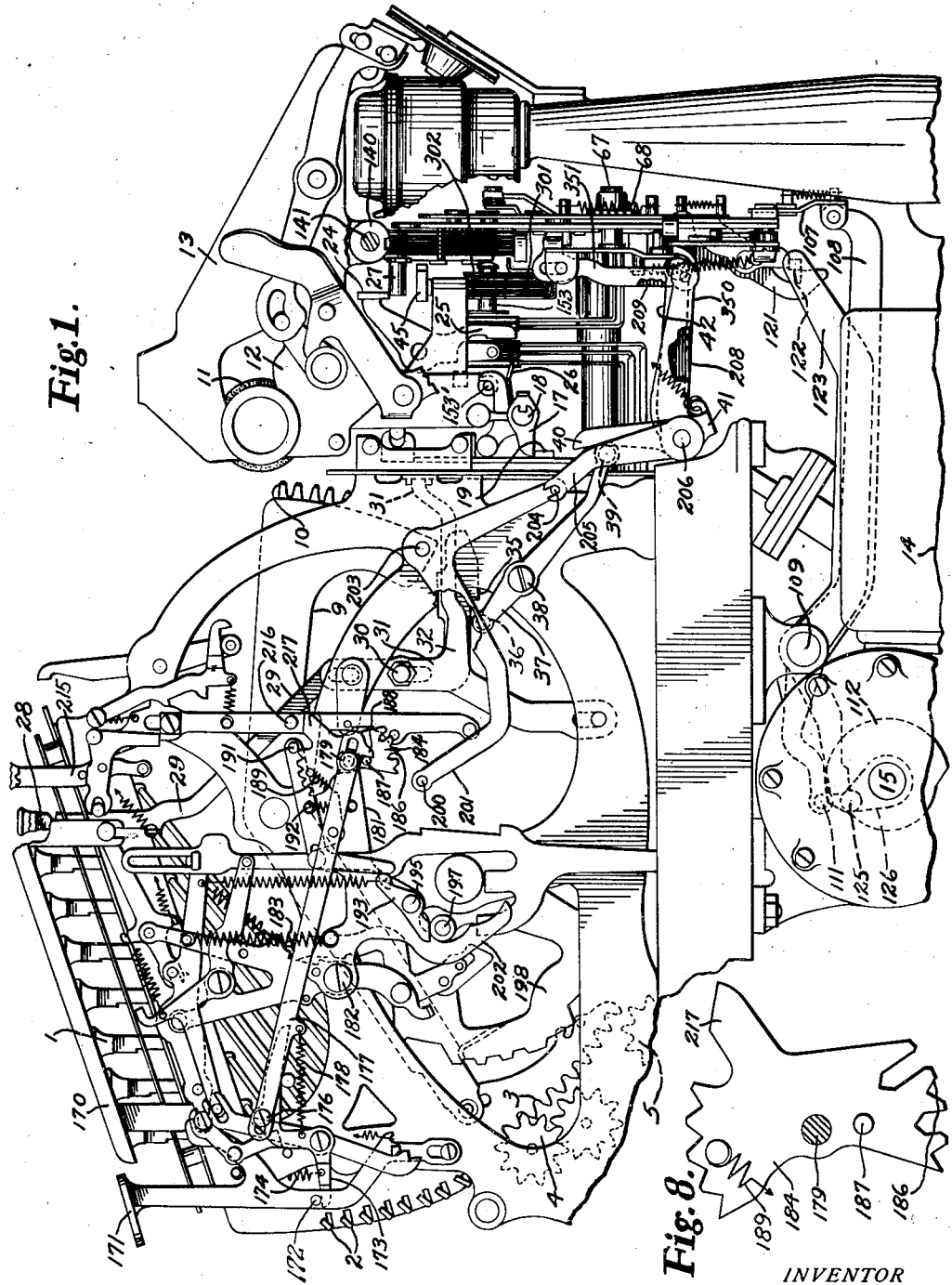
Figure 1 is a right side elevation of a machine embodying the present invention, the parts being illustrated in normal position.
Fig. 8 is a detail of one of the indexing elements.

Referring to Fig. 1, the regular motor bar 170 is illustrated, which, in a sense, is an operation control key and which, of course, is the usual means for starting the machine on a cycle of operation. A lower auxiliary motor bar 171 is also provided which through a lateral arm causes depression of the regular motor bar in a well-known manner and, in addition, may also cause a particular type of machine operation and a particular register selection if desired, as is common in this type of machine.

The lower motor bar is provided with a laterally projecting stud 172 (Figs. 1 and 7) which engages the lower arm of a bell crank 173 pivoted to the machine frame and urged clockwise by a spring 174. The upper arm of bell crank 173 has a stud and slot connection 176 with the forward end of a link 177 urged forwardly by a spring 178. This link extends rearwardly and at its rear end has a stud and slot connection 179 (Fig. 1) with the rear end of a lever 181 pivoted at 182 to the machine frame and urged counterclockwise by a spring 183.

Pivoted on the stud 179 at the end of lever 181 is an index plate 184 having a series of notches 186 along its lower edge and a stud 187 projecting laterally from one side adapted to be engaged by a depending projection 188 formed on the rear end of link 177. The index plate is urged counterclockwise by a spring 189 and is rocked clockwise against the action of spring 189 by link 177 when the lower motor bar is depressed. The index plate 184 is retained in adjusted position by a stud 191 engaging the upper serrated end of the plate 184. This stud is carried on the outer end of one arm of a bell crank 192 pivoted to the machine frame and having a lower end which is engaged by one end of a pawl 193 pivoted at 195 to the lever 181.

The pawl 193 is engaged by a stud 197 carried by the full stroke sector 198. The arrangement of the pawl 193 is such that, as the full stroke sector moves counterclockwise at the beginning of a machine cycle, the stud 197 moves away from the pawl 193, allowing the crank 192 to move clockwise under spring tension until its stud 191 engages one of the notches on the upper edge of the index plate, thereby holding this plate in its indexed position during a machine cycle until the full-stroke sector returns to normal near the end of said cycle, after which the stud 197 will again lift the stud 191 from the index plate 184 to permit reindexing of the plate.

During each machine operation the index plate 184 is lowered to such an extent that, if it has been indexed by being rocked about its pivot 179 out of normal position, its lower notched end will engage and depress a stud 200 carried by a bell crank 201 pivoted at 203 on the machine frame. For this purpose lever 181 is provided with a lower curved arm 202 also adapted to be engaged by the stud 197 of the full stroke sector 198 which is first rocked counterclockwise and then returned clockwise to normal during a machine cycle. As the full-stroke sector rocks counterclockwise at the beginning of a machine cycle, the stud 197 engages the arm 202 and rocks the lever 181 and index plate 184 clockwise, thus moving the index plate 184 into engagement with the stud 200.

The rear arm of crank 201 has a stud and fork connection 204 with an arm 205 secured to shaft 206, which latter shaft extends across the rear of the machine and to which is secured an arm 208 for controlling the tabulating mechanism. Arm 208 is connected to a link 209, most readily seen in Fig. 4, which link is formed at its upper end with a laterally extending lug 210 (Fig. 4) overlying the stud 83 on the vertical slide 84. This stud, as previously explained, overlies one arm of the rocker 80 carried by the vertical rocker slide 82, which controls the position of the index plate 88. Accordingly, depression of the lower motor bar and the resulting machine operation control the carriage tabulating movement by lowering the rocker 80 and its associated slide a predetermined distance, depending upon the particular notch 186 in plate 184 which engages the stud 200 in crank 201. The effect of the motor bar may be varied by changing the notches 186 in the lower edge of plate 184.

It will be understood that, if a control roll 70 or a three-armed member 150 is already engaged with the skip lever 71, slide 82 and index plate trates the selector 64 indexed over the #6 slide which is being lowered.

It is obvious that, as the carriage approaches a predetermined column where the carriage is intended to be stopped after a desired skip tabulating movement has occurred, the latch 136, associated with the depressed slide 58, must be released to release the bail 24 and the "tab" bar 18.

This release is accomplished by release disks 140 (Figs. 3, 6, 9, and 10) adjustably secured on a shaft 141 of the traveling paper carriage by set screws 140' (Fig. 10). These disks are arranged to selectively engage the upper arms of the latches 136 to release the slide 58 that may have been set, to thereby release the "tab" bar and allow the next "tab" stop 17 to arrest the carriage.

As previously explained, there are six slides 58 and six latches 136 arranged in a group transversely of the direction of movement of the carriage. The upper ends of the latches 136 appear as a group in Fig. 10. In order that the disks 140 may selectively engage these latches, the disks are cut out or slotted as indicated so as to pass one or more of the latches. One of these disks 140 can be located in each columnar position of the carriage. Each disk can be cut out in a manner to pass all but a selected latch or latches. This allows a wide variety of tabulating movements to be obtained, of which the following are examples.

Assume that operations start with the carriage in column 1 where a small-sized control roll 70 indexed the mechanism so that, during a machine cycle, a slide 58 corresponding to the size of the roll is set and latched by its latch 136. Assume, also, that the disks 140 in columns 2, 3 and 4 are cut out so that they will not trip the latch 136 for the slide 58 that has been set but that the disk 140 in the fifth column will trip the latch. The result is that the carriage will move through columns 2, 3 and 4 and stop in column 5.

Next, assume another transaction in which operations start in column 2, where a larger control roll sets a different slide 58 which is latched by its latch 136. Assume, also, that the disks 140 in columns 3, 4 and 5 are slotted so that they will not release the latch 136 for the second slide 58. The result is that the carriage will move from column 2 to column 6 without being affected in any way by the disk 140 in column 5 which previously stopped the carriage in said column. It will be clear that the disk 140 for releasing the last-mentioned latch 136 could be located in the fourth column and it would not interfere with the movement of the carriage to the fifth column in the first example. In fact, these release disks 140 can be located in any columnar position desired and each can control the arrest of the carriage without regard to the others when each controls only an individual one of the latches 136.

As so far described, the regular tabulating movements of the carriage are controlled by the usual tabulating mechanism in the usual way, and this is the preferred construction. However, it should be understood that the regular tabulating movements of the carriage can also be controlled by the improved mechanism heretofore described for skip tabulation. In that event, one of the index slides 58 is assigned to regular carriage tabulation. The carriage would then have a roll 70 in every carriage position for setting that slide 58 and a corresponding release disk 140 to trip the latch 136 for that slide 58 in each column. Or it can be done by having one of the slides 58 normally active and then having a disk 140 for tripping out the latch 136 for said slide 58 in every column. In the event it is desired to skip columns, a different slide 58 is set up and later tripped out after the desired number of columns have been skipped as heretofore explained. When the mechanism is used in this way, the number of skips available is, of course, reduced because one set of devices is used for regular carriage tabulation.

The term "tabulating mechanism," as used herein, is intended to refer to the mechanism for controlling the movements of the carriage in what is ordinarily known as tabulating direction, irrespective of the type of power used to move the carriage.

Thus, it will be clear that, in any given columnar position of the carriage, the carriage itself automatically indexes the tabulating mechanism to determine the next position to which the carriage shall move at the end of the machine cycle. It may move to the next adjacent column, or it may move to any one of the positions remaining in the tabulating direction if there are sufficient numbers of slides 58 and disks 140. This indexing may occur in any column and in each and every column. The position to which the carriage moves after being indexed in different columns depends upon the location of the release disks that trip the latches for the slides, and it is evident that a wide variation can be obtained.

b. Program devices for varying the effect of indexing carriage tabulation

The indexing, when automatically controlled by the carriage, is governed by the control rolls such as the rolls 70 on the carriage. The column to which the carriage will move in accordance with the indexing of the tabulating mechanism is governed by release disks such as the disks 140 on the shaft or bar 141. In other words, there is a program means for indexing the tabulating mechanism automatically and a program means for determining the effect of this indexing. Provision is made for very quickly changing the condition of either or both of these program means to thus vary the automatic indexing as well as the effect of said indexing.

Referring to Figs. 6 and 9, instead of using rolls 70 for automatically indexing the tabulating mechanism, multiple-arm members such as the three-arm members 150 are provided in the desired columnar position of the carriage. These members 150 have three arms of different lengths, each of which terminates in a grooved end 151 adapted to engage the skip control lever 71 to rock it varying degrees depending upon the size of the active arm. These three-armed members are illustrated as being utilized in only one of the columnar positions of the carriage (Fig. 6), although it is obvious that they may be utilized in any or all of the possible carriage positions, as may be desired. The three-armed member is secured to a sleeve 152 (Fig. 9) rotatably carried by a stud 153 (Figs. 6 and 9) adjustably secured on the bar 153' removably secured to the carriage frame. The sleeve also carries a gear 154 which is adapted to be engaged by a toothed rack or slide 155 mounted for horizontal movement on the carriage frame and having a forked connection 156 with a slide 157 connected by a link 88 will already be indexed to a certain position. If, after this, the lower motor bar is depressed and the link 209 is lowered, the slide 82 will be lowered a greater distance, thereby indexing plate 88 to a different position than the roll 70 alone would cause it to take. On the other hand, if there is no roll 70 active in the particular columnar position of the carriage in which the lower motor bar is depressed, the control plate 88 will be indexed in accordance with the effective lower notch 186 on plate 184. The plate 184 may be provided with notches of the desired depth to cause the machine to provide any particular indexing desired from the auxiliary motor bar.

The illustrated machine also has an upper motor bar 215 (Fig. 1), the depression of which also affects the tabulating movement of the carriage. The upper motor bar carries a stud 216 which, when the bar is depressed, directly engages an upper arm 217 (Figs. 1 and 8) of the index plate 184 and rocks it clockwise in a manner similar to the lower motor bar, except that the degree of movement of the index plate is different from that occasioned by depression of the lower auxiliary motor bar. In other words, a different notch 186 in the lower edge of the index plate 184 is positioned for engagement with stud 200 on crank 201 when each of the two auxiliary motor bars is depressed. In other respects the operation is the same as that described in connection with the lower auxiliary motor bar 171.

Thus, the auxiliary motor bars, through the index plates 88 and 184, both of which are alterable, provide a manual means for indexing the tabulating movements of the carriage either alone or jointly with the carriage to control the sequence or program of movements of the carriage and thereby the program of operations of the machine.

2. Total key control

Figure 7:
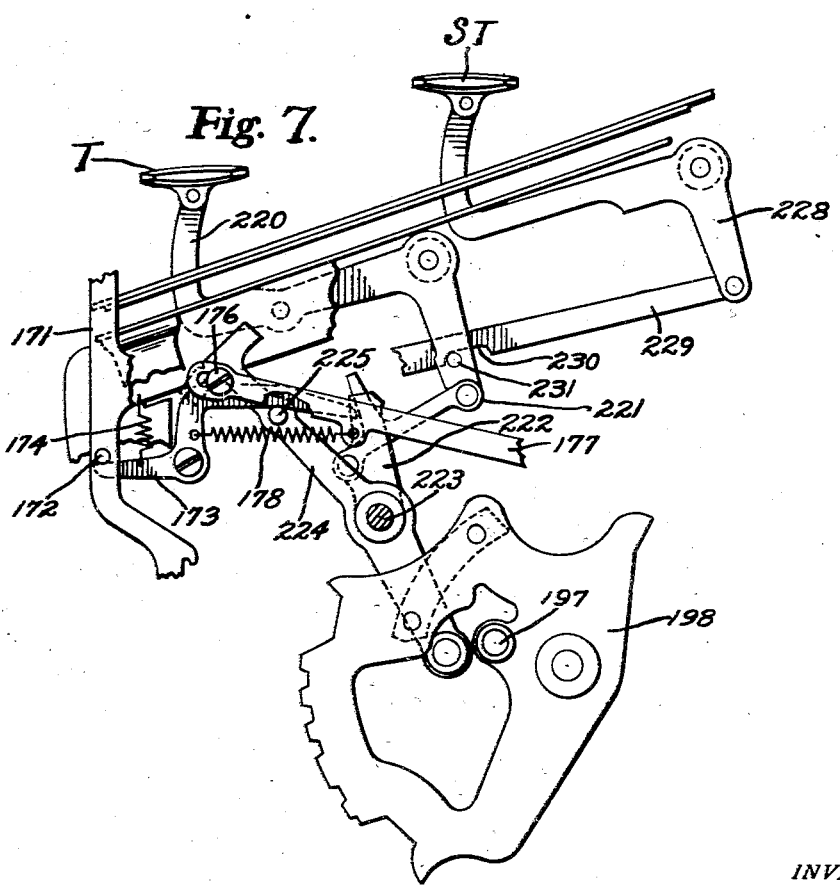
Fig. 7 is a partial left side elevation illustrating the control from the total and subtotal keys.

Provision is also made for indexing the tabulating mechanism manually by means of the total key, which, of course, is a function or operation control key. The mechanism for accomplishing this is best shown in Fig. 7.

The total key T (Fig. 7) is carried by a crank 220 which it rocks counterclockwise upon key depression. Crank 220 is connected by a link 221 to an arm 222 fastened to shaft 223. Also secured to shaft 223 is a second arm 224 having a stud 225 in a position to engage the rearwardly projecting arm of bell crank 173. Accordingly, upon depression of the total key, the bell crank 173 is rocked in the same manner as it is rocked by depression of the lower auxiliary motor bar, except that the degree of movement is different from that imparted by depression of the lower auxiliary motor bar. Therefore, depression of the total key T causes an indexing of the index plate 184 which, in turn, causes a predetermined indexing of the index plate 88 and controls the tabulating movement of the paper carriage.

3. Subtotal key control

The subtotal key ST (Fig. 7) is another manual means for indexing the tabulating mechanism.

As illustrated in Fig. 7, the subtotal key ST is carried by and operates a crank 228 which is connected to a link 229 having a notch 230 in its lower edge which engages a stud 231 carried by the lower arm of crank 220 operated by the total key. Therefore, depression of the subtotal key also actuates link 221 and crank 173, causing an indexing movement of the index plate 184 and also index plate 88.

Depression of either total key causes a movement of index plate 88 which is in addition to any movement of plate 88 caused by a roll 70 on the carriage and the tabulating movement of the carriage is controlled in accordance with the total movement of the plate 88. Depending upon the particular form of the plate 88 and of the plate 184 being used, the tabulating movement of the carriage in a machine cycle following depression of either total key or auxiliary motor bar 171 or 215 may be different if a carriage control roll 70 is active at the time the total key or auxiliary motor bar is depressed than it would be if no carriage control roll is active at the time the total key or auxiliary motor bar is depressed.

From the foregoing it can be seen that the program of tabulating movements of the carriage can be varied by means of the lever 159 to give the operator of the machine a choice of as many programs of carriage tabulating movements as there are positions for the lever 159 (there being provision for three positions of said lever and thus three programs which can be made effective by means of this lever in the illustrated embodiment) and that further variations of the program of tabulating movement of the carriage are obtainable by the operator by means of the two auxiliary motor bars and total and subtotal keys in the illustrated embodiment. When the lever 159 is shifted, the change of carriage tabulation program caused thereby remains in effect until the lever 159 is again shifted. This is particularly useful when the work requires a temporary change from the use of one columnar form to the use of a different columnar form or work sheet. Depression of one of the auxiliary motor bars or the total key or subtotal key can be utilized to cause a change in the carriage tabulation which will be effective for the carriage movement which occurs at the end of the machine operation following the depression of said motor bar or key but may or may not affect subsequent carriage tabulating movements during the completion of the same line of entries, depending upon whether the carriage merely skips a columnar position in which, but for the depression of said motor bar or key, the carriage would otherwise have stopped, or whether the carriage stops in some columnar position in which it otherwise would not have stopped and in which the carriage may automatically set the tabulation controls in some different manner. This provides an extremely flexibly variable and extremely versatile and adaptable control of the carriage tabulating movements.

INDEXING THE CARRIAGE RETURN

In order to further increase the adaptability of the machine to various bookkeeping forms, selective control of carriage return movements to and from various columnar positions is provided. As in the case of tabulating control, the carriage return controls are susceptible of being changed very readily to vary the sequence or program of carriage movements.

As previously described, the carriage is returned by power and controlled through a clutch element 48 in a manner similar to the disclosure in the Rinsche Patent No. 1,580,534. The member 48 is, in turn, controlled by a lever 50 under control of another lever 52. When the lever 52 (Fig. 2) is rocked counterclockwise, that is, when its forward end is lowered, the gears 44 and 47 are engaged and the power carriage return mechanism is operative to return the carriage from left to right as the machine is viewed from the front.

In order that the clutch may be selectively controlled, the forward end of the lever 52 is provided with a stud 240 which projects through the slots 241 of six slides 242 mounted for vertical sliding movement upon the plate 57 by studs 243. The slides are normally urged upwardly by springs 244, there being a separate spring for each slide. The arrangement is such that, when any slide is lowered, the lever 52 is rocked counterclockwise and the clutch 48 is moved to connect the power carriage return mechanism. Each of the slides 242 is formed at its lower end with a laterally projecting lug 246 adapted to be selectively engaged by the upper inturned lug 247 (Figs. 3 and 4) of an index member or selector 248 pivoted to the slide 66 at 249 and normally urged clockwise by a spring 253. In other words, the selector 248 is similar to selector 64 and is mounted upon the same plate for vertical sliding movement for lowering the selected slide 242 after the selector has been indexed.

a. Automatic indexing—carriage return

Figure 3:
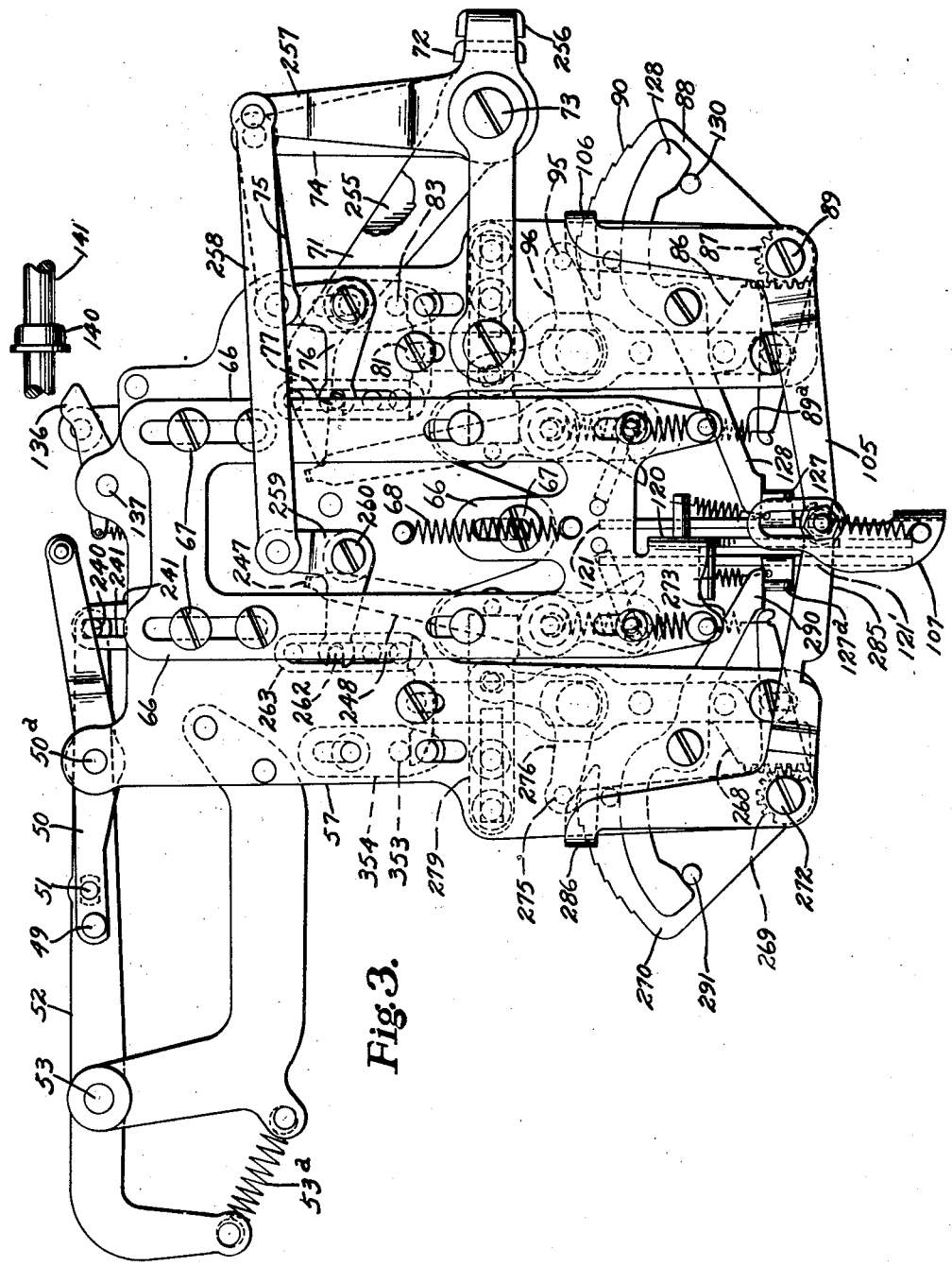
Fig. 3 is a rear elevation of the carriage control unit, the parts being in normal position.

The selector 248 is automatically indexed in a manner similar to the selector 64, that is, by means of carriage rolls 250 (Figs. 1 and 14) or by three-armed members 251 (Fig. 9) mounted on the carriage studs 153 alongside of rolls 70 or members 150. The three-armed members 251 have secured thereto gears 154 (Fig. 6) which mesh with rack 155 for adjustment thereby to selectively index the selector 248 to engage a slide 242 as described in connection with selector 64. The rolls 250 engage the carriage return arm 255 (Figs. 4 and 14) of the yoke 256 which has a second arm 257 connected by a link 258 to a bell crank 259 pivoted at 260 to plate 57. The other arm of bell crank 259 (Figs. 3 and 4) has a stud and fork connection 262, with a vertical slide 263, which slide carries a stud 264 adapted to engage one arm of a rocker 266 pivoted at its center to the upper end of a rocker slide 267. This latter slide is mounted for vertical sliding movement upon plate 57 and carries a rack 268 upon its lower end which meshes with gear 269 secured to an index plate 270 having a stepped upper edge 271. The index plate 270 is pivoted at 272 and is constantly urged clockwise as shown in Fig. 4, or counterclockwise as shown in Fig. 3 by a spring 273. The plate 271 is therefore positioned or indexed in accordance with the size of the active roll 250 or arm of member 251 to cause a selection of one of the slides 242 as follows:

The upper stepped edge 271 of the index plate 270 is engaged at the proper time by a stud 275 carried upon one end of crank 276 pivoted at 277 to the main supporting plate 57. The upper end of crank 276 has a stud and slot connection 278 with a horizontal slide 279 which engages a stud 281 carried by the selector 248 and thereby limits the movement (Fig. 4) of the selector 248 which tends to move in a clockwise direction under the urge of its spring 253. Therefore, the selector 248 is indexed by the index plate 270 which, in turn, is positioned in accordance with the carriage roll 250 to cause the selector 248 to overlie a selected one of the slides 242.

As in the case of the selector 64, it is not desirable to permit stud 275 to drag across the upper stepped surface 271 of the index plate 270. Therefore, a crank 285 is pivoted at 272 and formed with an upper cam end 286 for raising the stud 275 out of engagement with the index plate 270, as was described in connection with the crank 105. The crank 285 has a lower arm connected to the link 107 and is therefore actuated simultaneously with the crank 106 in the same timed relation so that stud 275 is lowered into contact with the index plate 270 during the latter part of the machine operation and after the plate 270 has been indexed.

Following indexing of the selector 248, it is lowered simultaneously with the selector 64, both being attached to plate 66, and therefore lowers the selected slide 242 to actuate the clutch control lever 48 and cause operation of the carriage return mechanism.

As previously explained, the slide 66 is only lowered when the stepped sector 88 is displaced from normal position by a control roll 70 or a three-armed member 150 or by depression of an auxiliary motor bar or the total or subtotal key. This was accomplished through the provision of pawl 127, lever 128 and a stud 130. In some instances it is desired to actuate the carriage return mechanism when the skip tabulating mechanism is ineffective. For this purpose the second pawl 121' is utilized and caused to engage the square stud 122 under certain conditions. This second pawl 121' has a lateral extension 127ª adapted to be engaged by one end of a lever 290 which is controlled by a stud 291 so as to retain the pawl inactive, that is, out of engagement with square stud 122 whenever the index plate 270 is in normal position. Whenever the index plate 270 leaves its normal position, the pawl 121' is released to engage stud 122 so that the slide 66 is lowered independently of any movement of the skip tabulating mechanism.

The selected slide 242 having been lowered by the selector 248, it must be retained in lowered position. For this purpose latches 295 are pivoted on stud 296 and urged clockwise (Figs. 2 and 4) into engagement with shoulders 297 by the same springs 138 which urge latches 135 into operative position. It will be understood that there is a separate latch 295 for each slide 242 in order that the latches may be released selectively and individually. The lower ends of the latches are notched to receive arms 298 of bails 299 secured to shaft 300 and having grouped arms 301 arranged closely adjacent each other transversely of the carriage and in position to be engaged by release rolls 302 (Figs. 1, 6 and 14) mounted on the carriage studs 153 for releasing the latches and stopping the carriage return movement. The release rolls 302 are not notched like the disks 140 for controlling the tabulating mechanism because, in the case of the rolls 302, they are mounted parallel to the direction of movement of the carriage and, hence, the roll for any one arm 301 will not interfere with the rolls for the other arms of the series. If there is to be a permanent set-up for the release of all latches six release rolls 302 will be fixed to the carriage in the desired columnar positions.

On the other hand, if it is desired to provide for variations in the release of any or all of the carriage return slides, members 303 (Fig. 6) are used in place of the corresponding rolls 302. These members 303 have arms of equal lengths rather than arms of unequal lengths, and may be rotated to bring the arms either into active or inactive position with respect to the return selector 255. For convenience in adjustment the arms carry gears 154 which mesh with the rack 155 so that the arms may be simultaneously adjusted with the disks 140 and the other three-armed members 150, by movement of the manual lever 159.

From the foregoing it will be seen that in any of its columnar positions, the paper carriage may index the carriage return mechanism to return the carriage to any one of a wide variety of positions. Or, in other words, the carriage itself indexes, or governs, the position to which it shall be returned.

b. *Program devices for varying the effect of indexing carriage return*

As previously explained, the carriage return mechanism may be indexed by the rolls 250 or members 251 mounted on the carriage frame and adjustable by gears 154 that mesh with the rack 155 which is manually movable and likewise the members 303 may also be adjusted by rack 155. In the embodiment illustrated, the same rack is employed that is moved by the lever 159. Thus, the position of the rolls 250 or members 251 and the members 303 may be changed at the same time that the rolls for the tabulating mechanism are varied. A separate rack and hand lever for the rolls 250 or members 251 and/or the members 303 may be used, if desired.

Thus, the program of carriage return, or the effect of indexing said return mechanism, can be quickly changed; and this may be done simultaneously with the change in the program for carriage tabulation.

c. *Manual indexing—carriage return*

Provision is made for indexing the carriage return mechanism by the auxiliary motor bars and the total and subtotal keys heretofore mentioned.

It will be recalled that the indexing of the tabulating mechanism from the auxiliary motor bars and the total and subtotal keys was accomplished by rocking the shaft 206, which, in turn, rocks the arm 208. An arm 350 (Fig. 1), also secured to the shaft 206, is connected to a vertical link 351. Link 351 has a laterally projecting lug 352 (Fig. 4) which overlies a stud 353 carried by a vertical slide 354 and adapted to engage the other arm of rocker 266. Accordingly, depression of either of the auxiliary motor bars or either of the total keys causes a depression of stud 353 and a lowering of rocker 266 and slide 267, thus causing an indexing movement of the index plate 270 in the same manner as explained in connection with plate 88 and which movement is in addition to or independent of any movement imparted to this plate 270 by reason of rolls 250. The operation in this connection is the same as that described in connection with the tabulating mechanism and need not be repeated in detail.

INDEXING THE CARRIAGE MOVING MEANS TO SELECTIVELY MOVE THE CARRIAGE TO DIFFERENT POSITIONS IN EITHER DIRECTION

When the carriage occupies any columnar position except its extreme right and extreme left positions, the carriage is susceptible of movement in either direction; and the spring for moving the carriage in one direction and the motor for moving it in the other constitute a means for moving said carriage in two directions—the spring deriving its energy from the motor.

Assuming that the carriage is in a given columnar position, that neither the carriage tabulating mechanism nor the carriage return mechanism is indexed, and that none of the slides 58 are used for regular carriage tabulation, the carriage will move in tabulating direction during the latter part of a machine cycle initiated by depression of regular motor bar unless, of course, the "carriage-normal" key is depressed. During each machine cycle in which either the tabulating index plate 88 or the carriage return index plate 270 is indexed, either an indexed slide 58 for carriage tabulation or an indexed slide 242 for carriage return is pulled down, and if a slide for each has been indexed, both slides 58 and 242 will be pulled down and remain down until released because the same slide 66 is utilized for lowering the slides 58 and 242. This movement occurs after the printing mechanism has operated. The tabulating mechanism releases the carriage and the pulling down of the slide 58 for the tabulating mechanism conditions the mechanism to allow the carriage to continue its travel until the slide is released. The pulling down of the carriage return slide 242 conditions the carriage return mechanism for operation. Even though the tabulating mechanism is conditioned to allow the carriage to move in tabulating direction, nevertheless, the carriage return would normally take hold and move the carriage in the return direction. But, since the indexed tabulating control slide is also latched down the carriage will not be held in the position to which it is returned but, after the set return slide 242 is released, the carriage will move in the tabulating direction to the position where the set tabulating slide 52 is released by a disk 140.

Each of the special motor bars and the total and subtotal keys, as well as the carriage, indexes both index plates 88 and 270 simultaneously and it follows that when the means for moving the carriage is indexed by any of the indexing controls, index slides 58 and 242 for both of such movements will be pulled down during a machine cycle.

One method of avoiding this difficulty is to omit certain of the slides, either for the tabulation or carriage return. For example, if the tabulating mechanism is indexed by an auxiliary motor bar in a certain position of the carriage, the carriage return slide normally indexed by said motor bar in said carriage position is omitted. Accordingly, as the machine is operated upon depression of said motor bar in said carriage position, no carriage return operation will take place because no slide is moved to set the carriage return into operation. Likewise, one or more of the tabulating slides can be omitted when a carriage return operation is desired from a certain carriage position in order that said slide will not be set to interfere with carriage movements. While this difficulty can be avoided by leaving out the appropriate slides as just mentioned, the services of a mechanic are required and it reduces the capacity of the machine. A much better solution has been provided in the construction illustrated in Figs. 11 and 12, which makes the indexing of the tabulating and the return mechanisms mutually exclusive. In describing this construction, the same reference characters will be used on the parts that are the same and the same reference characters with the suffix "a" will be employed on corresponding parts that have been changed only slightly from those shown in prior figures.

Figure 11:
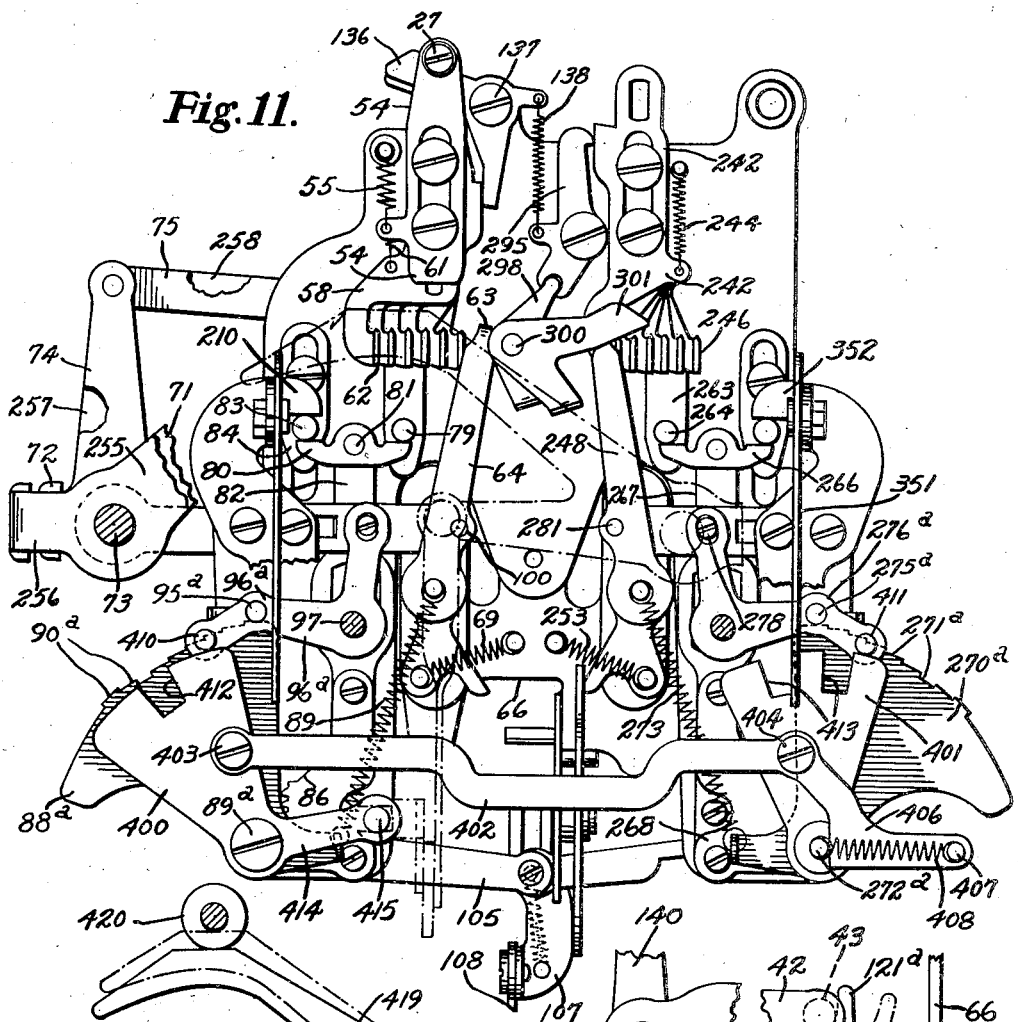
Fig. 11 is a partial rear elevation illustrating a slightly modified form of control assembly.

A tabulating index plate 88ᵃ is employed which is similar to the plate 88 with the exception that plate 88ª is provided with eight steps 90ª instead of six. Likewise, a carriage return index plate 270ª having eight steps 271ª is employed. The first six steps on each of these plates are the same as the steps 90 and 270 heretofore described. Since only six sets of index slides are provided, the height of the two additional steps on each of the plates must be the same height as some of the preceding six steps if they are to effect selection of slides. The additional steps, however, provide for a greater range of selection, because of the joint control of indexing by the carriage and the manual control which differs from the sole control by either. For example, assume that the carriage indexes one of the index plates to its No. 3 position. Also, assume that, if one of the auxiliary motor bars is depressed, it would, acting by itself, move the index plate to its No. 4 position. If, after the carriage has indexed the plate to its No. 3 position, the auxiliary motor bar is depressed, the plate will be moved four steps further which carries it to its No. 7 position. The No. 7 step on index plate 88ª in Fig. 11 is the same height as the No. 5 step. Accordingly, the joint control by the carriage and one of the motor bars indexes the plate in its No. 5 position, which is different from the indexing caused by either the carriage or the motor bar when used alone.

As heretofore described, both the tabulating and the carriage return mechanisms may be indexed at the same time, no matter whether the indexing occurs automatically under the control of the carriage, or on the depression of one of the auxiliary motor bars, or the total keys. Since the carriage tabulation and the carriage return should not operate simultaneously, and since it may not be desirable to remove one or more of the slides 58 or 242, provision has been made for making the selection of the tabulating and return mechanisms mutually exclusive.

This is accomplished by an auxiliary index plate 400 (Figs. 11 and 12) pivoted at 89ª and associated with index plate 88ª of the tabulating mechanism and an auxiliary index plate 401 pivoted at 272ª and associated with the index plate 270ª. The two plates are interconnected for simultaneous operation by a connecting link 402 pivotally connected to plate 88ª at 403 and to plate 270ª at 404. Link 402 is provided with a projecting arm 406 which extends beyond the pivotal point 272ª and which carries a stud 407 to which one end of a tension spring 408 is attached, the other end being connected to pivot 272ª, whereby the spring urges both auxiliary index plates 400 and 401 clockwise until the arm 406 limits against the pivot 272ª.

The auxiliary index plates 400 and 401 control studs 410 and 411, respectively, carried by extensions of cranks 96ª and 276ª which also carry the sensing studs 95ª and 275ª, respectively, and retain either or both of the sensing studs inoperative when the plates are in certain positions. The auxiliary index plates 400 and 401 are also provided with slots 412 and 413, respectively, of sufficient width to permit the entry of studs 410 and 411, thereby enabling or permitting the studs 95ª and 275ª to engage the index plates 88ª and 270ª when the auxiliary index plates are properly positioned.

The auxiliary index plate 400 is provided with an arm 414 carrying a stud 415 which engages the forked end of a lever 416 connected to one end of a link 417, the other end of which is connected to one arm of a bail 418 having a second cam arm 419 positioned to be engaged by an independent set of various sized control rolls 420 arranged on the carriage. The arrangement is such that with the plates 400 and 401 in normal position, both sensing studs are prevented from moving downward, that is, both studs 95ª and 275ª are disabled. If a small sized roll 420 is utilized in any desired columnar position of the carriage, both plates 400 and 401 are rocked clockwise a slight distance, in which position the stud 411 drops into a notch 413 thus enabling the sensing stud 275ª and the carriage return mechanism. In this position, the stud 410 does not overlie a notch 412 and, accordingly, the tabulating mechanism is disabled. If a larger control roll 420 is engaged in any columnar position of the carriage, both plates 400 and 401 are rocked clockwise a further distance to a position where stud 411 does not overlie a notch in plate 401, but stud 410 does overlie a notch 412 in plate 400. This will permit the indexing of the tabulating mechanism but will prevent or disable indexing of the carriage return mechanism.

Figures 12, 13:
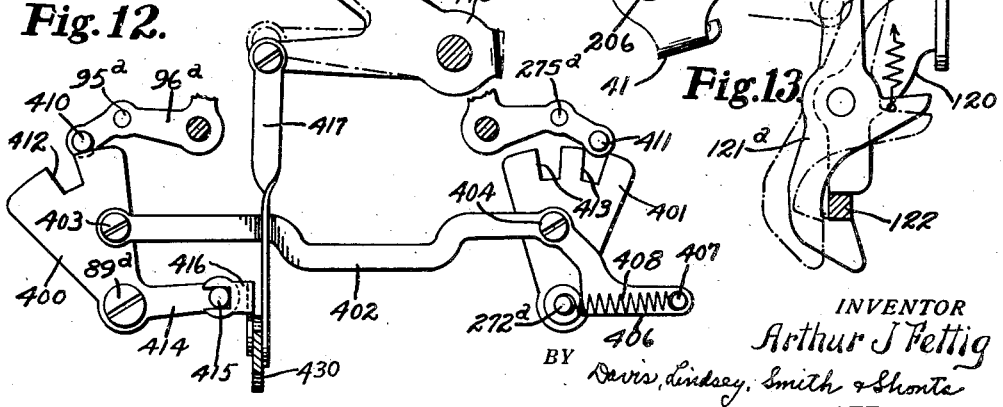
Fig. 12 is a fragmentary detail illustrating carriage control of the modification.
Fig. 13 is a fragmentary detail of the slide operating means.

The stud 415 (Fig. 12), by means of which the plates 400 and 401 are moved, may be controlled manually from one of the auxiliary motor bars, or by the total or subtotal keys, by means of a link 430 shown in Fig. 12 which is connected by a suitable linkage to the appropriate bar or key.

The slide 66 is preferably lowered during each machine cycle except while the carriage normal key 28 is down; and, for this purpose, only one pawl 121ª is used instead of the two pawls 121 and 121′ employed in the first described construction. The pawl 121ª is urged counterclockwise (Fig. 13) into engagement with the square stud 122. Since the slide 66 is lowered during each machine cycle except when the carriage normal key is down, the studs 130 and 291 as well as the levers 128 and 290 are omitted.

Assuming that the carriage is in a position where the tabulating mechanism is indexed, when the machine is given a cycle the slide 66 is lowered after the printing mechanism has operated. This pulls down the appropriate tabulating slide 58, but no slide 242 for the carriage return mechanism is pulled down because the selecting arm 248 is in its unindexed position where, as it moves downward with slides 66, it will not engage any of the slides 242. Accordingly, the carriage return mechanism will not be operated. Likewise, when the machine is indexed for carriage return, no slide for the tabulating mechanism will be pulled down. In the event that one of the motor bars or total keys is depressed, it may index either the tabulating or the carriage return mechanisms to the exclusion of the other because of the plates 400 and 401 under control of stud 415 controlled by carriage or other mechanism. This indexing by the motor bar or total key may be a sole control, or it may be a joint carriage and manual control, in which event, the motor bar, or total or subtotal keys, will change the indexing of the plates 400 and 401 as called for by the carriage position.

Thus, the means for moving the carriage may be indexed to move the carriage in either direction and to arrest the carriage in any one of three or more positions in the selected direction. The indexing may be automatic under the control of the carriage or manual under the control of one of the motor bars or total keys, or it may be a joint control by both the carriage and one of the motor bars or total keys.

EXAMPLES OF OPERATION

The general operation of a machine of the type disclosed is well understood and need not be repeated here. It will also be understood that, for any particular bookkeeping form, the necessary rolls, both indexing and release, will be adjusted for the various columns on the form being used. If two or more forms are to be used in the same machine, the different sets of rollers will, of course, have to be included and adjusted for the different positions of the lever 159.

In order to bring out some of the various possibilities of carriage movement obtainable in a machine embodying the present invention, reference will be made to Fig. 15 in which fifteen transactions or entries have been diagrammatically illustrated, together with the corresponding controls such as carriage roll selection, manual control (motor bars and keys), and lever position. The figure is arbitrarily made in connection with a machine having twelve columnar positions and the illustration is for control of carriage movement in tabulating direction only. It will be assumed that, with the carriage in the positions from which it starts the illustrated tabulating movements, the return controls are normalized by rolls 420 on the carriage. It will be understood that similar control may be had of carriage return movements.

Referring more particularly to Fig. 15, transaction 1 illustrates an entry made when the carriage is in column A with no roll 70 or member 150 being active and the regular motor bar being depressed with the control lever in position 1. In such transactions, the carriage will tabulate a single column from A to B as indicated.

Transaction 2 illustrates an entry made with the carriage starting from column B in which position a member 150 with an arm having the effect of a #1 roll 70 indexes the No. 1 skip slide when the regular motor bar is depressed. In this transaction, the lever 159 is again in position 1 but the release disk 140 for the No. 1 slide is set in column G and, accordingly, upon depression of the motor bar and following printing, the carriage skip-tabulates from column B to column G.

Transaction 3 also illustrates an entry made with the carriage in column B. In this transaction the control lever 159 is in position 2 and a second arm of the member 150 in the column B position, having the effect of a #3 roll 70, upon depression of the regular motor bar, sets the #3 skip slide and causes a skip-tabulation from column B to column F, there being a release disk 140 for the No. 3 slide positioned in column F. The use of the control roll No. 3 does not determine the column in which the carriage will be stopped but determines the skip slide selected for release by the disk 140 which may be placed in any desired column, column F in the illustrated entry. Of course, two or more control rolls 70 are not used in one column. Instead, in column B, there is a member 150 having three arms so proportioned that, when the lever 159 is in its #1 position, the then active arm of the member 150 has the effect of a #1 roll 70 as in the case of transaction 2, and when, as in transaction 3, the lever 159 is in the #2 position, the then active arm of the member 150 has the effect of a #3 roll 70.

In transaction 4, the lever 159 has been moved to its #3 position and the then active arm of the member 150 has the effect of a No. 6 roll to select the No. 6 tabulating slide. A release disk 140 for the #6 slide is used in column H. Upon depression of the regular motor bar, the carriage is caused to skip-tabulate to column H where it is stopped by release disk 140.

Transaction 5 indicates an entry made with the carriage in column A with no control roll 70 or member 150 being active but the No. 2 auxiliary motor bar being depressed with the lever 159 in No. 1 position. Depression of the auxiliary motor bar causes a No. 2 skip slide to be selected and the carriage skip-tabulates to column E where a release disk 140 releases the selected slide.

Transaction 6 illustrates an entry being made in column A with no roll 70 or member 150 being used but a No. 4 auxiliary motor bar being depressed, with the lever 159 being in No. 1 position. Depression of this auxiliary motor bar causes selection of a No. 4 tabulating slide and the carriage is permitted to skip-tabulate to column I where a disk 140 releases the slide.

Transaction 7 illustrates a transaction being made with the carriage in column A with no roll 70 or member 150 being used and in which transaction a No. 5 total key is depressed. Depression of the total key causes selection of No. 5 tabulating slide which permits the carriage to skip-tabulate to column D where this slide is released by a release disk 140.

Transaction 8 illustrates another entry made with the carriage in column A with the lever 159 is in position 2. Fig. 15 indicates in connection with transactions 1 and 5 that no roll 70 or member 150 is active in column A. This result is obtained by placing in column A a member 150 such that, when the lever 159 is in its #1 position, as in transactions 1 and 5, no arm of said member 150 is active but, when the lever 159 is in its #2 position as in transaction 8, an arm having the effect of a #6 roll is active to select the #6 tabulating silde. In this entry the selected slide No. 6 is released in column J by a disk 140.

Transaction 9 illustrates an entry being made in column B where the No. 2 auxiliary motor bar is depressed with the lever 159 in #2 position so that the member 150 is positioned to make active the arm having the effect of a #3 roll. The active arm of the member 150 would cause selection of No. 3 slide if used alone, as in transaction 3, whereas the No. 2 auxiliary motor bar used alone would cause selection of a No. 2 slide. The use of the two together, however, causes a No. 5 slide to be selected and in the illustrated transaction this slide is released in column D as in transaction 7. Accordingly, in this entry the carriage is skip-tabulated from column B to column D.

Transaction 10 illustrates an entry being made in column B by depression of the No. 2 auxiliary motor bar with the lever 159 in its #3 position so that the member 150 is positioned with the arm having the effect of a #1 roll active. The active arm of the member 150 alone would cause the selection of the No. 6 tabulating slide as in transaction 4 and the No. 2 auxiliary motor bar used alone would cause the selection of the No. 2 tabulating slide. The use of the two together causes movement of the index plate 88ª to the eighth step which corresponds to the fourth step and, accordingly, the No. 4 slide is selected which is released in column I. In other words, the carriage skip-tabulates from column B to column I.

Transaction 11 illustrates an entry made with the carriage in column E in which the regular motor bar is depressed with the lever 159 in No. 1 position to position a member 150 so that an arm having the effect of a #1 roll is active. By comparing this transaction with transaction 2, it will be noted that transaction 2 starts in column B, whereas transaction 11 starts in column E, but in both transactions the #1 tabulating slide 58 is selected and the carriage comes to rest in both instances in column G.

Transaction 12 illustrates another entry made in column E where the No. 2 auxiliary bar is depressed with the lever 159 in position 2 to position the member 150 so that an arm with the effect of a No. 3 roll is active. The No. 3 arm of the member 150 alone would select the No. 3 tabulating slide but the depression of the No. 2 auxiliary motor bar in connection therewith causes the No. 5 slide to be selected, which slide in this entry is released in column K, causing the carriage to skip-tabulate from column E to column K. Comparison of transactions 7 and 9 with transaction 12 illustrates the fact that the same slide 58 may be used in two transactions provided the columns skipped do not overlap. The fifth slide was selected in transactions 7 and 9 as well as in transaction 12.

The variations in control of the carriage tabulating movements illustrated by the above-described examples are only a very few of the variations that can be obtained by the operator by depressing different motor bars or shifting the lever 159 to different positions for different operations of the machine, all without any of the difficulties of rearranging or reassembling any control parts on the carriage. It should also be noted that these variations in control of the carriage tabulating movements are obtained by varying the selection of the slides 58 without making any use of the possibility of varying the effects of the release disks 140 by the shifting of the lever 159. If this latter possibility is also used, still further variations of the control of the carriage tabulating movement are obtainable.

Transaction 13 illustrates an entry made in column E where a normalizing roll 420 is employed and the No. 4 auxiliary bar is depressed. The No. 4 auxiliary motor bar would ordinarily select the No. 4 tabulating slide which would cause the carriage to skip-tabulate to column I but the normalizing roll 420 disables the skip-tabulating mechanism, and, therefore, the carriage tabulates only one column, i. e., to column F.

Transaction 14 illustrates an entry made in column F where a No. 2 roll is employed and the regular motor bar depressed with the shift lever in position 1. In this instance, a release disk 140 is placed in column L instead of in column F, the carriage having passed column F.

Fig. 16 illustrates schematically an example of work as well as a setup of the carriage tabulating and return controls of the present invention for enabling the machine to perform said example of work. The figure shows portions of three forms adapted to be used in the machine at different times after merely changing the position of the lever 159. The lines on all three forms have been numbered consecutively for ease of description.

In the example illustrated in Fig. 16, the machine is provided with twelve column stops 17 in the relative positions shown. For clarity, the positions of the column stops as well as of the tabulating and return control members are shown as positions on the forms which are opposite to a fixed point on the machine at the times at which the various members become effective during the travel of the carriage rather than as actual positions of the various members on the paper carriage.

When the first form shown, which contains lines 1, 2 and 3, is to be used in the machine, the lever 159 is placed in position I. By means of the mechanism shown in Fig. 6 this positions the tabulating and return control members so that those portions of said control members which are illustrated at the bottom thereof in Fig. 16 are active. When the lever 159 is moved to position II, the tabulating and return control members are rotated by the mechanism shown in Fig. 6 to such positions that the right side portions of the skip release disks 140 as illustrated in Fig. 16 and the upper right-hand portions of the skip members 150, return members 251, and return release members 303 become effective and, when the lever 159 is moved to position III, the upper portions of the skip release disks 140, and the upper left-hand portions of the skip members 150, return members 251 and return release members 303 become effective. In considering the operations in lines 1, 2 and 3, it is therefore, necessary only to consider the lower portions of the tabulating and return control members shown in Fig. 16.

The several arms of the skip members 150, the skip roll 70, the return roll 250, and the arms of the return members 251 shown in Fig. 16 are designated by the numbers of the skip slides 58 or return slides 242 which are set thereby. The notches in the skip release disks 140 are designated by the numbers of the skip slides 58, the latches 136 for which are not tripped by reason of the notches in the skip release disks. The return release rolls 302 and members 303 in Fig. 16 are designated by their position numbers corresponding to the position numbers of the return slides 242, the latches 295 for which are tripped by said roll and members respectively.

In line 1, when the paper carriage is held in position 1 by the column stop P1 and the machine is operated by depressing the regular motor bar designated by the letter R, the skip member 150 will set the #1 skip slide 58, and the carriage will tabulate past positions 2, 3 and 4 corresponding to column stops P2, P3 and P4 by reason of the fact that both of the skip release disks 140 between carriage positions 1 and 4 are notched to pass the latch 136 for the #1 skip slide 58 without tripping said latch, but the skip release disk 140 between positions 4 and 5 is not so notched and, therefore, trips said latch. The carriage, therefore, skip tabulates to position 5, whereupon the machine is again operated by depression of the regular motor bar. As there is no skip roll 70 or member 150 effective when the carriage is in position 5, no skip slide 58 is set and consequently the paper carriage performs a normal tabulating movement and is arrested in position 6 by the column stop P6. Here, a skip roll 150 with a #1 arm again sets the #1 skip slide 58 which is latched in position by its latch 136 and, when the machine is again operated by depression of the regular motor bar, the carriage tabulates past positions 7, 8 and 9 until, between positions 9 and 10, another skip release disk 140 not notched to pass the latch of the #1 skip slide 58 trips said latch to release said slide and permit the carriage to be stopped by the column stop P10. Here, a #1 skip roll 70 again sets the #1 skip slide 58 so that, when the machine is again operated by depression of the regular motor bar, the carriage skips position 11 and is arrested in position 12 where a #2 arm of a three-armed return member 251 causes the setting of the #2 return slide 242 so that, when the machine is again operated by depression of the regular motor bar, the carriage is returned until it is slightly past position 8 in line 2, whereupon an arm of a return release member 303 in the #2 position trips the latch 295 for the #2 return slide 242 so that the carriage is then permitted to move slightly in the tabulating direction until it is arrested by the column stop P8.

In position 8 in line 2, a #3 arm of a return member 251 sets the #3 return slide 242 so that when the machine is operated, the carriage is again moved in the return direction. During the initial part of this movement, the arm of a return release member 303 in the #2 position slightly ahead of position 8 again trips the latch 295 for the #2 return slide, but this does not affect the #3 return slide 242 which was set in carriage position 8. The carriage, therefore, continues its return movement until the arm of a return release member 303 in the #3 position trips the latch for the #3 return slide after the carriage has moved slightly past position 3. The carriage then moves slightly in the tabulating direction until arrested by the column stop P3 where a #2 arm of a return member 251 again sets a #2 return slide so that, when the machine is again operated, the carriage returns slightly past position 1 where the #2 return slide is released by the second of a full set of return release rolls 302 placed in positions 1 to 6. Without the operator doing anything except to set up the required entries on the keyboard of the machine and depress the regular motor bar to operate the machine as many times as required, the carriage movements shown in lines 1 and 2 may be repeated as often as desired.

For the second form containing lines 4 to 8, the lever 159 is moved to position II as explained above and the carriage is moved manually or otherwise to position 2 which is the first columnar position on this second form. With the carriage in position 2 and lever 159 in position II, a #1 arm on a skip member 150 sets the #1 skip slide 58 so that, upon operation of the machine by the regular motor bar, the carriage tabulates to position 4 where it is arrested by reason of a skip release disk 140 which releases the #1 skip slide after the carriage passes position 3 but before it reaches position 4. A #1 arm on another skip member 150 again sets the #1 skip slide so that, upon operation of the machine by depression of the regular motor bar, the carriage skips position 5 because the skip release disk 140 between positions 4 and 5 passes the latch for the #1 skip slide 58. Another skip release disk 140 between positions 5 and 6 unlatches the #1 skip slide so that the carriage is arrested in position 6 where a #1 arm on another skip member 150 again sets the #1 skip slide so that, when the machine is operated by depression of the regular motor bar, the carriage tabulates past position 7, after which a skip release disk 140 releases the #1 skip slide in time to cause the carriage to be arrested in position 8. No skip or return slide is set when the carriage is in position 8 in line 4 so that, upon operation of the machine by depression of the regular motor bar, the carriage tabulates to position 9 where a #1 arm on another skip member 150 sets the #1 skip slide again. Upon again operating the machine by depression of the regular motor bar, the carriage tabulates past position 10 because the skip release disk 140 between positions 9 and 10 is notched to pass the latch for the #1 skip slide but the skip release disk 140 between positions 10 and 11 is not so notched and, therefore, releases the #1 skip slide 58 in time to cause the carriage to be arrested in position 11.

With the carriage in position 11 in line 4, a total is to be taken and, for this reason, the machine is operated by depression of the total key. The total key is arranged to depress the studs 83 and 353 sufficiently to move the selector levers 64 and 248 one step and, as there is no skip roll 70 or member 150 but there is a #1 return roll 250 in carriage position 11, the #1 skip slide and the #2 return slide are set. For reasons previously explained, the carriage will be moved in the return direction and the #1 skip slide will be quickly unlatched by the first disk 140 which is not notched for passing the latch for the #1 skip slide without tripping it. The carriage is returned until shortly after it has passed position 6, whereupon an arm of a return release member 303 in the #2 position unlatches the #2 return slide and permits the carriage to settle back into the #6 position in line 5 where a #1 arm of a skip member 150 sets the #1 skip slide 58. Then the machine is set into operation by depressing the lower auxiliary motor bar 171 which, like the total key, causes the studs 83 and 353 to be depressed sufficiently to move the selectors 64 and 248 one step. The combined effect of the lower motor bar and the #1 arm on the skip roll 150 in position 6 is to cause the #2 skip slide to be set.

The #1 return slide 242, if present, would be set when the machine is operated with the carriage in position 6 in line 5 but said return slide is omitted in the assembly used for the example of work illustrated in Fig. 16 in order to avoid the necessity of adding the plates 400 and 401 for this example of work. This also provides one very simple illustration of the fact that the flexibility of the mechanism is such as to provide alternative ways of setting the controls for a particular example of work. Instead of omitting the #1 return slide, it would have been possible to add the plates 400 and 401 and to arrange for the lower auxiliary motor bar 171 to move the plates 400 and 401 to a position such that, when the lower motor bar is depressed, the tabulating mechanism will be indexed whereas the return mechanism will not be indexed. However, as the example of work shown in Fig. 16 does not demand anything near the full capacities of the tabulating and return controls to take care of automatic variations in the carriage movements, it is simpler in the illustrated example to merely remove the #1 return slide 242.

The absence of the #1 return slide 242 from the assembly is the reason for placing the #1 return roll 250 in carriage position 11 to cause the #2 return slide to be set when the total key is depressed in position 11 in line 4.

When the machine is operated by depressing the lower motor bar with the carriage in position 6 in line 5, with the #2 skip slide set as mentioned above, the carriage tabulates past positions 7 and 8 because there is no skip release disk 140 between positions 6 and 7 and the skip release disk 140 between positions 7 and 8 is notched to pass the latch for the #2 skip slide but the carriage is arrested in position 9 because the skip release disk 140 between positions 8 and 9 is not notched to pass the latch for the #2 skip slide and so release the latter. It should be noted that, with the lever 159 in the same position for lines 4, 5 and 6, when the machine is operated with the carriage in position 6 in line 4, the carriage tabulates to and is stopped in position 8, and, when the machine is operated in position 6 in line 5, the carriage skips position 8 where it stopped in line 4 and moves on to position 9 where it stops in line 6. This variation in tabulating movement of the carriage has been obtained by a variation in control secured by selection between the regular and auxiliary lower motor bars.

With the carriage in position 9 in line 6, a #1 arm on a skip member 150 sets the #1 skip slide so that, upon operation of the machine from the regular motor bar, the carriage tabulates past position 10 because the skip release disk 140 between positions 9 and 10 is notched to pass the latch for the #1 skip slide but the carriage is arrested in position 11 because of the release of the #1 skip slide by the disk 140 located between positions 10 and 11. Although the carriage was returned from position 11 in line 5 to position 6 in line 6, the #1 return roll 250 is without effect with the carriage in position 11 in line 6 because the #1 return slide 242 is absent and the total key is not depressed with the carriage in position 11 in line 6, but the machine is operated by depressing the regular motor bar so that the carriage tabulates to position 12. Here, a #2 arm on a return member 251 acts in combination with the total key which is depressed for the operation in position 12 of line 6 to cause the setting of the #3 return slide so that the carriage is moved in the return direction until it is slightly past position 2 and an arm on a return release member 303 in the #3 position releases the #3 return slide.

Simultaneously with the setting of the #3 return slide with the carriage in position 12 of line 6, the #1 skip slide was set by reason of depression of the total key but the #1 skip slide is released by the first unnotched disk 140 which encounters the #1 skip slide latch 136 during the return movement of the carriage. The placing of this unnotched skip release disk 140 between positions 11 and 12 is a precaution which will prevent the carriage from skipping past position 12 regardless of how the machine may be operated or misoperated with the carriage in previous columnar positions.

For operations on the third form containing lines 9 to 15, the lever 159 is moved to position III and the carriage is moved manually or otherwise to position 1. With the carriage in position 1 in line 9, the #1 skip slide is set by a #1 arm on a skip member 150 so that, upon operation of the machine by depression of the regular motor bar, the carriage moves to position 6 because all of the skip release disks 140 between carriage positions 1 and 5 are notched to pass the latch for the #1 skip slide, whereas the disk 140 between carriage positions 5 and 6 will release the latch for the #1 skip slide. With the carriage in position 6, no skip or return slide is set so that, upon operation of the machine from the regular motor bar, the carriage tabulates to position 7 where a #2 arm on a return member 251 sets the #2 return slide so that, upon operation of the machine from the regular motor bar, the carriage is moved in the return direction until slightly past position 3 where an arm on a return release member 303 in the #2 position releases the #2 return slide and permits the carriage to settle back into position 3 in line 10.

Here, the #2 skip slide is set by a #2 arm on a skip member 150 so that, upon operation of the machine from the regular motor bar, the carriage moves in tabulating direction to position 9 in line 11 by reason of the fact that all of the skip release disks 140 between positions 3 and 8 are notched to pass the latch for the #2 skip slide, whereas the skip release disk 140 between positions 8 and 9 trips the latch for the #2 skip slide.

With the carriage in position 9 in line 11, a #3 arm on a return member 251 sets the #3 return slide so that, upon operation of the machine by depression of the regular motor bar, the carriage moves in the return direction until slightly past position 4, whereupon an arm on a return release member 303 in the #3 position releases the #3 slide and permits the carriage to settle back into position 4 in line 12. Here, a #3 arm on a skip member 150 sets the #3 skip slide so that, upon operation of the machine by depression of the regular motor bar, the carriage moves in tabulating direction to position 11 in line 13 for the reason that all of the skip release disks 140 between positions 4 and 10 are notched to pass the latch for the #3 skip slide whereas the disk 140 between carriage positions 10 and 11 trips the latch for the #3 skip slide. In the operation of the machine from the regular motor bar with the carriage in position 11 in line 13, no skip slide is set and, not withstanding the presence of the #1 return roll 251, no return slide is set because of the absence of the #1 return slide so that the carriage tabulates to position 12. Here, the action of a #3 arm on a return member 251, combined with the action of the total key, causes the #4 return slide 242 to be set so that, when the machine is operated by depression of the total key, the carriage moves in the return direction until slightly past position 1 where it is released by the fourth of a full set of return release rolls 302 located in the positions 1 to 6.

It should be noted that the example of work illustrated in Fig. 16 utilizes only to a relatively very small degree the capabilities of the new tabulating and return controls to obtain programs of varied automatic carriage tabulating and return movements. It will be noted that, for the example of work illustrated in Fig. 16, only three of the skip slides 58 have been utilized and only three of the return slides have actually been used though a fourth one has been removed from the machine. However, as explained above, this fourth return slide 242 need not have been removed if the plates 400 and 401 had been placed on the machine together with the control connections for them. Also, only two motor bars and the total key have been used in the example of work shown in Fig. 16. With the plates 400 and 401 on the machine, it would have been possible to utilize the upper motor bar in place of the regular motor bar in lines 9 to 15 to obtain the same carriage movements as illustrated in the said lines but without utilizing the third position of the lever 159. This serves as another illustration of the flexibility of the mechanism in providing for various alternative ways of securing the desired carriage movements and also serves to illustrate further how little of the very extensive capacity of the new skip and return mchanism to provide for automatic programs of varied carriage tabulating and return movements is utilized in the example of Fig. 16. However, it is believed that the illustration of Fig. 16 will indicate enough of the adaptabilities and capacities of the new carriage tabulating and return control mechanism to render the illustration and description of more extensive and complicated examples unnecessary to a full understanding of the invention.

From the foregoing, it will be apparent that the principles of this invention provide for almost unlimited variations in control of the carriage. In addition to the changes in roll selection, manual control and lever position, there are provided additional points of adjustment for those cases where a particular arrangement of index plates 88, 88ª, 270 or 270ª and the index plate 184 does not permit the foregoing adjustments to accommodate the machine to a new form or system. In such cases it is only necessary to substitute a different plate for one or more of the index plates to adapt the machine to a new form or system. This substitution of one or more index plates does not necessitate tearing down the entire machine but is a simple matter that can be attended to in the field by the nearest agency.

The foregoing mechanism provides for great flexibility whereby a single machine may be adapted to a multitude of forms and bookkeeping systems by the mere selection of proper carriage control rolls and disks and the manipulation of a single adjustable lever. For even more complete single control, the carriage rolls 420 for shifting the auxiliary plates 400 and 401 also may be placed under control of the hand lever 159.

In other words, a machine has been provided which permits of manual adjustment to adapt the machine to many different uses and which permits of a single structural change to adapt the machine to even more uses and systems.

It will be apparent to those skilled in the art that many changes in the details of construction may be made without departing from the spirit and scope of this invention as defined in the appended claims.

I claim:

1. A machine of the class described having means for driving the machine through cycles of operation, a movable carriage, means for moving said carriage, control means operable from said driving means in a cycle of operation of the machine initiated while said carriage is in a first predetermined columnar position to enable said carriage moving means to move said carriage, said control means normally disabling said carriage moving means when said carriage arrives in a second predetermined columnar position, variably settable means governing said control means and settable when the carriage is in said first predetermined columnar position to any one of a plurality of individual settings corresponding to different ones of a plurality of other columnar positions in the same direction as said second predetermined columnar position, manipulative means for causing said driving means to drive said machine through cycles of operation, setting means controlled by said manipulative means and operable while the carriage is in said first predetermined columnar position to set said settable means to any one of said settings, and means cooperating with said settable means in accordance with the position of said carriage to cause said control means to disable said carriage moving means when said carriage arrives in that one of said other columnar positions which corresponds to the setting of said settable means.

2. A machine of the class described having means for driving the machine through cycles of operation, a movable carriage, means for moving said carriage, control means operable from said driving means in a cycle of operation of the machine initiated while said carriage is in a first predetermined columnar position to enable said carriage moving means to move said carriage, said control means normally disabling said carriage moving means when said carriage arrives in a second predetermined columnar position, a plurality of settable devices governing said control means and settable individually when the carriage is in said first predetermined columnar position, manipulative means for causing said driving means to drive said machine through cycles of operation, setting means controlled by said manipulative means and operable while the carriage is in said first predetermined columnar position to selectively set said settable devices, and release means cooperating with said settable devices individually in different ones of a plurality of other columnar positions of said carriage in the same direction as said second predetermined columnar position to cause said control means to disable said carriage moving means when said carriage arrives in that one of said other columnar positions where said release means cooperates with the settable device which has been set.

3. A calculating machine of the class described having means for driving the machine through cycles of operation, a movable carriage, means for moving said carriage, control means operated from said driving means during a machine cycle to enable said moving means to move said carriage, a series of three or more individually settable devices governing said control means, a series of elements on said carriage adjustable to selectively cooperate with different ones of said settable devices in different positions of said carriage to cause said control means to disable said carriage moving means, a column-selecting movable device, means for moving said selecting device to different positions, and means operated from said driving means at the beginning of a machine cycle for selectively setting said settable devices under the control of said selecting device.

4. A machine of the class described having a means for driving the machine through cycles of operation, a movable carriage, means for moving said carriage, control means governing said carriage moving means, variably settable means governing said control means and settable, when the carriage is in a predetermined columnar position, to any one of a plurality of individual settings corresponding to different ones of three or more other columnar positions in one direction from said predetermined columnar position, manipulative means for causing said driving means to drive said machine through cycles of operation, setting means controlled by said manipulative means and operable while the carriage is in said predetermined columnar position to set said settable means to any one of said settings to cause said control means to enable said carriage moving means to move said carriage, and means cooperating with said settable means in accordance with the position of said carriage to cause said control means to disable said carriage moving means when said carriage arrives in that one of said other columnar positions which corresponds to the setting of said settable means.

5. A machine of the class described having a means for driving the machine through cycles of operation, a movable carriage, means for moving said carriage, control means governing said carriage moving means, at least three individually settable devices governing said control means, manipulative means for causing said driving means to drive said machine through cycles of operation, setting means controlled by said manipulative means to selectively set said settable devices to cause said control means to enable said carriage moving means to move said carriage, and release means cooperating with different ones of said settable devices in different ones of at least three other columnar positions of said carriage in one direction from said predetermined columnar position to cause said control means to disable said carriage moving means when said carriage arrives in that one of said other columnar positions where said release means cooperates with the settable device which has been set.

6. A machine of the class described having means for driving the machine through cycles of operation, a movable carriage, means for moving said carriage in a tabulating direction, tabulating control means operable from said driving means in a cycle of operation of the machine to enable said carriage moving means to move said carriage, a group of individually settable devices governing said tabulating control means, means for moving said carriage in the return direction, return control means for enabling the latter moving means to move said carriage in the return direction, a group of individually settable devices governing said return control means, manipulative means for causing said driving means to drive said machine through cycles of operation, setting means controlled by said manipulative means to selectively set said settable devices of both groups, means for selecting the group of settable devices in which a settable device is to be set, and release means cooperating with said settable devices individually in different columnar positions of said carriage to cause said control means to disable the enabled carriage moving means when said carriage arrives in the columnar position where said release means cooperates with the set settable device.

7. A machine of the class described having means for driving the machine through cycles of operation, a movable carriage, means for moving said carriage laterally in both directions, a variably settable means, setting means automatically controlled in accordance with the different columnar positions of said carriage to select different settings of said variably settable means in different columnar positions of the carriage and operated from said driving means in a cycle of operation of the machine to give said variably settable means the setting selected, control means governing said moving means, and means cooperating with said variably settable means in accordance with the settings thereof and in accordance with the positions of said carriage to cause said control means to disable said carriage moving means when said carriage has been moved to different predetermined columnar positions for predetermined different settings of said settable means.

8. A calculating machine of the class described having means for driving the machine through cycles of operation, a movable carriage, means for moving said carriage, control means for governing said moving means, a series of devices cooperating with said control means and selectively settable to cause said control means to enable said moving means to move said carriage and controlled by said carriage to cause said control means to disable said moving means in different predetermined carriage positions for different settings of said settable means, and means governed by said carriage and operated from said driving means during a machine cycle to selectively set said settable devices.

9. A calculating machine of the class described having a movable carriage, means for moving said carriage, control means for governing said moving means, a series of three or more individually and selectively settable devices governing said control means, means to selectively and individually set said settable devices, a series of members on said carriage to condition said setting means to selectively set different ones of said settable devices in different positions of said carriage and a series of elements on said carriage cooperating with said settable devices selec ively in different positions of said carriage to cause said control means to disable said carriage moving means.

10. A calculating machine of the class described having means for driving the machine through cycles of operation, a movable carriage, means for moving said carriage, control means for governing said moving means, selectively settable devices governing said control means, means for setting said settable devices, a plurality of manipulative members, an indexing device governed by said manipulative members, and means operable from said driving means at the beginning of a machine cycle to cause said indexing device to index the setting means.

11. A calculating machine of the class described having a movable carriage, means for moving said carriage, control means for governing said moving means, selectively settable devices governing said control means to cause the latter to enable said moving means to move said carriage, means for selectively setting said settable devices, carriage-controlled means cooperating with said selectively settable devices to cause said control means to disable said carriage moving means when said carriage has moved to different positions for different settings of said settable devices, a manipulative means, and means controlled jointly by said carriage and said manipulative means for indexing said setting means.

12. A calculating machine of the class described having a movable carriage, means for moving said carriage, control means for governing said moving means, a series of three or more individually and selectively settable devices governing said moving means, a series of elements on said carriage adjustable to selectively cooperate with different ones of said settable devices in different positions of said carriage to cause said control means to disable said moving means when said carriage reaches the position where one of said elements cooperates with the set settable device, a column-selecting indexable means for controlling the setting of said settable devices, means governed by said carriage for variably indexing said indexable means in accordance with a predetermined program of carriage movement, and manipulative means for varying the effect of said carriage-governed means on said indexable means to vary the program of carriage movement.

13. A machine of the class described having a movable carriage, means for moving said carriage, control means for governing said carriage moving means, a variably settable means cooperating with said control means and settable to any one of a plurality of effective settings to cause said moving means to move said carriage, carriage-controlled means cooperating with said variably settable means to cause said control means to disable said carriage moving means when said carriage has moved to different positions for different settings of said variably settable means, manually controlled setting means operable to set said variably settable means, and means controlled by the carriage in a plurality of columnar positions to select different ones of said settings to be given said variably settable means by said setting means when the carriage is in different ones of the last-mentioned columnar positions.

14. A machine of the class described having means for driving the machine through cycles of operation, a movable carriage, means for moving said carriage, control means for governing said carriage moving means, a variably settable means settable to any one of a plurality of different settings and cooperating with said control means to cause said carriage to be moved laterally, carriage-controlled means cooperating with said variably settable means to cause said control means to disable said carriage moving means when said carriage has moved to different positions for different settings of said variably settable means, setting means controlled automatically in a plurality of columnar positions of the carriage to select different ones of said settings of said variably settable means in different ones of said carriage positions and operated from said driving means in a cycle of operation of the machine to impart the selected setting to said variably settable means, and means operable manually to vary the effect of the automatic control of the selection of settings of said variably settable means by said setting means.

15. A machine of the class described having a movable carriage, means for moving said carriage, control means for governing said moving means, a series of three or more selectively settable devices governing said control means, program means on said carriage including elements controlling the selective setting of different ones of said settable devices in different predetermined positions of said carriage, program means on said carriage including elements controlling the selective restoration of different ones of said settable devices in different predetermined positions of said carriage, and means for adjusting a plurality of said elements of said program means simultaneously to vary the selection of settable devices, the setting and restoration of which are controlled by said elements in said predetermined positions of said carriage.

16. A machine of the class described having means for driving the machine through cycles of operation, a movable carriage, means for moving said carriage, control means for governing said carriage moving means and operated from said driving means during a cycle of operation of the machine to enable said carriage moving means to move said carriage, a variably settable means cooperating with said control means, setting means controlled automatically in accordance with the positions of said carriage for giving said variably settable means different settings in accordance with a predetermined program, position selecting means controlled automatically in accordance with the positions of said carriage to cooperate with said variably settable means in different positions of said carriage for different settings of said variably settable means to cause said control means to disable said moving means, and manipulative means for readily adjusting said setting means and said position selecting means to thereby change both the program of settings of said variably settable means and the effects of said settings on the determining of the positions where the carriage will be stopped.

17. A machine of the class described having means for driving the machine through cycles of operation, a movable carriage, means for moving said carriage, a variably settable means, a series of setting control elements automatically controlled in accordance with the positions of said carriage and each adjustable independently of the other elements of said series to be effective in different positions of the carriage, setting means operated from said driving means as said machine is given a cycle of operation to cause said variably settable means to be set under control of the setting control element which is effective when the carriage is in the position it then occupies, the several elements of said series of setting control elements being adapted to condition said setting means for predetermined different settings of said variably settable means, control means governed by said settable means and governing said moving means to enable said carriage moving means to move said carriage after the setting of said variably settable means, and means cooperating with said settable means in accordance with the settings thereof and in accordance with the positions of said carriage to cause said control means to disable said carriage moving means in different positions of said carriage for different settings of said settable means.

18. A machine of the class described having means for driving the machine through cycles of operation, a movable carriage, means for moving said carriage, a variably settable means, setting selecting means automatically controlled in accordance with the positions of said carriage to select different settings of said variably settable means in different positions of the carriage, setting means operated from said driving means in a cycle of operation of the machine to set said variably settable means under control of the setting selecting means, control means governed by said settable means and governing said moving means to enable said carriage moving means to move said carriage after the setting of said variably settable means, and a series of column selecting elements automatically controlled in accordance with the different positions of the carriage and each adjustable independently of the other elements of said series for cooperation of different ones of said elements with said variably settable means in different positions of said carriage, said variably settable means being controlled by different ones of said elements in accordance with its different settings to cause said control means to disable said carriage moving means in different positions of said carriage in accordance with the adjustments of said elements and the settings of said variably settable means.

19. A machine of the class described having means for driving the machine through cycles of operation, a movable carriage, means for moving said carriage, a variably settable means, a series of setting control elements automatically controlled in accordance with the positions of said carriage and each adjustable independently of the other elements of said series to be effective in different positions of the carriage, setting means operated from said driving means in a cycle of operation of the machine to cause said variably settable means to be set under control of the setting control element which is effective when the carriage is in the position it then occupies, the several elements of said series of setting control elements being adapted to condition said setting means for predetermined different settings of said variably settable means, control means governed by said settable means and governing said moving means to enable said moving means to move said carriage after the setting of said variably settable means, and a series of column selecting elements automatically controlled in accordance with the different positions of the carriage and each adjustable independently of the other elements of said series for cooperation of different ones of said column selecting elements with said variably settable means in different positions of said carriage, said variably settable means being controlled by different ones of said column selecting elements in accordance with its different settings to cause said control means to disable said carriage moving means in different positions of said carriage in accordance with the adjustments of said column selecting elements and the settings of said variably settable means.

20. A machine of the class described having means for driving the machine through cycles of operation, a movable carriage, means for moving said carriage, a variably settable means, a series of setting control elements automatically controlled in accordance with the positions of said carriage and each adjustable independently of the other elements of said series to be effective in different positions of the carriage, setting means operated from said driving means in a cycle of operation of the machine to cause said variably settable means to be set under control of the setting control element which is effective when the carriage is in the position it then occupies, the several elements of said series of setting control elements being adapted to condition said setting means for predetermined different settings of said variably settable means, readily manipulatable means for varying the effect of the effective setting control element in controlling said setting means, control means governed by said settable means and governing said moving means to enable said carriage moving means to move said carriage after the setting of said variably settable means, and means cooperating with said variably settable means in accordance with the settings thereof and in accordance with the positions of said carriage to cause said control means to disable said carriage moving means in different positions of said carriage for different settings of said settable means.

21. A machine of the class described having means for driving the machine through cycles of operation, a movable carriage, means for moving said carriage, a variably settable means, setting control means automatically controlled in accordance with the positions of said carriage to select different settings of said variably settable means in different positions of the carriage, setting means operated from said driving means as said machine is given a cycle of operation to cause said variably settable means to be set under control of the setting control means, readily manipulatable means for varying the effect of said setting control means in controlling said setting means, control means governed by said settable means and governing said moving means to enable said carriage moving means to move said carriage laterally after the setting of said variably settable means, and a series of position selecting control elements automatically controlled in accordance with the different positions of the carriage and each adjustable independently of the other elements of said series for cooperation of different ones of said control elements with said variably settable means in different positions of said carriage, said variably settable means being controlled by different ones of said control elements in accordance with its different settings to cause said control means to disable said carriage moving means in different positions of said carriage in accordance with the adjustments of said control elements and settings of said variably settable means.

22. A machine of the class described having means for driving the machine through cycles of operation, a movable carriage, means for moving said carriage, a variably settable means, a series of setting control elements automatically controlled in accordance with the positions of said carriage and each adjustable independently of the other elements of said series to be effective in different positions of the carriage and to select different settings of said variably settable means, setting means operated from said driving means in a cycle of operation of the machine to cause said variably settable means to be set under control of the setting control element which is effective when the carriage is in the position it then occupies, control means governed by said settable means and governing said moving means to cause said carriage moving means to move said carriage after the setting of said variably settable means, and means cooperating with said variably settable means in accordance with the settings thereof and in accordance with the positions of said carriage to cause said control means to disable said carriage moving means in different positions of said carriage for different settings of said settable means.

23. A machine of the class described having means for driving the machine through cycles of operation, a movable carriage, means for moving said carriage, a variably settable means, setting control means automatically controlled in accordance with the positions of said carriage to select different settings of said variably settable means in different positions of the carriage, setting means operated from said driving means in a cycle of operation of the machine to cause said variably settable means to be set under control of the setting control means, control means governed by said settable means and governing said moving means to cause said carriage moving means to move said carriage after the setting of said variably settable means, a series of column selecting control elements automatically controlled in accordance with the positions of the carriage and each adjustable independently of the other elements of said series for cooperation of different ones of said control elements with said variably settable means in different positions of said carriage, said variably settable means being controlled by different ones of said control elements in accordance with its different settings to cause said control means to disable said carriage moving means in different positions of the carriage in accordance with the adjustments of said control elements and settings of said variably settable means, and readily manipulatable means for effecting predetermined changes in the adjustments of a plurality of the elements of said series simultaneously.

24. A machine of the class described having means for driving the machine through cycles of operation, a movable carriage, means for moving said carriage, a variably settable means, a series of setting control elements automatically controlled in accordance with the positions of said carriage and each adjustable independently of the other elements of said series to be effective in different positions of the carriage and to select different settings of said variably settable means, setting means operated from said driving means in a cycle of operation of the machine to cause said variably settable means to be set under control of the setting control element which is effective when the carriage is in the position it then occupies, control means governed by said settable means and governing said moving means to cause said carriage moving means to move said carriage after the setting of said variably settable means, a series of column selecting control elements automatically controlled in accordance with the positions of the carriage and each adjustable independently of the other elements of said series for cooperation of different ones of said control elements with said variably settable means in different positions of said carriage, said variably settable means being controlled by different ones of said control elements in accordance with its different settings to cause said control means to disable said carriage moving means in different positions of the carriage in accordance with the adjustments of said control elements and settings of said variably settable means, and readily manipulatable means for effecting predetermined changes in the adjustments of a plurality of elements of each of said series of elements simultaneously.

25. A calculating machine of the class described having means for driving the machine through cycles of operation, a movable carriage, means for moving said carriage, control means governing said moving means and operable from said driving means in a cycle of operation of the machine to enable said moving means to move said carriage, a series of selectively settable devices governing said control means and controlled by said carriage in accordance with the positions thereof to cause said control means to disable said moving means in different predetermined carriage positions for different settings of said settable means, and means governed by said carriage and operated from said driving means during a machine cycle to selectively set said settable devices.

26. A machine of the class described having means for driving it through cycles of operation, a movable carriage, means for moving said carriage, control means operable to enable said moving means to move said carriage, a series of adjustable setting control elements on said carriage, a series of individually settable devices governing said control means, setting means controlled by different ones of said setting control elements in different positions of said carriage and operable from said driving means in cycles of operation of the machine to set selected ones of said settable devices under control of said setting control elements in accordance with the positions of said carriage, a series of retaining devices cooperating with individual ones of said settable devices to retain each settable device when set in set condition to retain said control means in condition enabling said moving means to move said carriage, and a series of adjustable release elements on said carriage and cooperating with said retaining devices to release set settable devices to cause said control means to disable said carriage moving means in different moved positions of said carriage, a plurality of said release elements each being formed to cooperate with at least a respective one of said retaining devices to release the respective settable device, if set, in different moved positions of said carriage without causing others of said retaining devices to release their respective settable devices as said carriage moves through said positions.

27. A calculating machine of the class described having a movable carriage, means for moving said carriage, control means for governing said moving means, a series of devices cooperating with said control means and selectively settable to cause said control means to enable said moving means to move said carriage and controlled by said carriage to cause said control means to disable said moving means in different predetermined carriage positions for different settings of said settable devices, and means governed by said carriage to selectively set said settable devices.

28. A calculating machine of the class described having means for driving the machine through cycles of operation, a movable carriage, means for moving said carriage, control means governing said moving means and operable from said driving means in a cycle of operation of the machine to enable said moving means to move said carriage, a series of selectively settable devices governing said control means and controlled by said carriage in accordance with the positions thereof to cause said control means to disable said moving means in different predetermined carriage positions for different settings of said settable devices, and means governed by said carriage to selectively set said settable devices.

ARTHUR J. FETTIG.